United States Patent [19]

Iizuka

[11] Patent Number: 5,664,030
[45] Date of Patent: Sep. 2, 1997

[54] METHOD AND APPARATUS FOR RECORDING/REPRODUCING MESH PATTERN DATA

[75] Inventor: Nobuo Iizuka, Hamura, Japan

[73] Assignee: Casio Computer Co., Ltd., Tokyo, Japan

[21] Appl. No.: 451,544

[22] Filed: May 26, 1995

Related U.S. Application Data

[62] Division of Ser. No. 869,012, Apr. 14, 1992, Pat. No. 5,454,054, which is a division of Ser. No. 530,630, May 30, 1990, Pat. No. 5,153,928.

[30] Foreign Application Priority Data

| Jun. 9, 1989 | [JP] | Japan | 1-145255 |
| Jun. 9, 1989 | [JP] | Japan | 1-145256 |
| Jun. 9, 1989 | [JP] | Japan | 1-145257 |

[51] Int. Cl.[6] ............................. G06K 9/20
[52] U.S. Cl. ............................. 382/321
[58] Field of Search ............... 382/112, 182, 382/183, 184, 306, 309, 310, 311, 321; 235/432, 436, 456, 437, 494, 462, 438

[56] References Cited

U.S. PATENT DOCUMENTS

| 3,780,271 | 12/1973 | Sharkitt et al. | 235/61.11 E |
| 3,982,226 | 9/1976 | Bunker et al. | 340/146.1 |
| 4,228,716 | 10/1980 | Linford | 84/1.18 |
| 4,322,754 | 3/1982 | Mason | 358/296 |
| 4,422,361 | 12/1983 | Ishii et al. | 84/1.18 |
| 4,437,378 | 3/1984 | Ishida et al. | 84/1.18 |
| 4,464,966 | 8/1984 | Ishida | 84/1.03 |
| 4,533,825 | 8/1985 | Yamada | 235/463 |
| 4,641,357 | 2/1987 | Satoh | 382/61 |
| 4,728,783 | 3/1988 | Brass et al. | 235/456 |
| 4,783,838 | 11/1988 | Matsunawa | 382/51 |
| 4,788,598 | 11/1988 | Ochi et al. | 358/260 |
| 4,794,239 | 12/1988 | Allais | 235/462 |
| 4,924,078 | 5/1990 | Sant'Anselmo et al. | 235/494 |
| 4,934,846 | 6/1990 | Gilham | 400/104 |
| 4,939,354 | 7/1990 | Priddy et al. | 235/456 |
| 4,958,337 | 9/1990 | Yamanaka et al. | 369/58 |
| 4,972,475 | 11/1990 | Sant'Anselmo | 380/54 |

(List continued on next page.)

FOREIGN PATENT DOCUMENTS

| 0384955 | 9/1990 | European Pat. Off. |
| 0439682 | 8/1991 | European Pat. Off. |
| 53-73026 | 6/1978 | Japan |

OTHER PUBLICATIONS

I/O 1988. 5 pp. 121–125.
Jas Journal 1987, vol. 27, No. 10, pp. 39–52.
Nihon Keizai Shimbun newspaper article, published by Nihon Keizai Shimbun, Tokyo, Japan, Apr. 10, 1992.
Nihon Keizai Shimbun article; Apr. 10, 1992.
Article from the Denpa Shinbun newspaper, Tokyo, Japan, dated Jun. 8, 1992.
Itohchu Electronics Co., Ltd., brochure, distributed at the exhibition, "Scan–Tech Japan 1992".

*Primary Examiner*—Yon J. Couso
*Attorney, Agent, or Firm*—Frishauf, Holtz, Goodman, Langer & Chick

[57] ABSTRACT

Recorded data is read by an image sensor from a recording medium on which the data is two-dimensionally recorded in a mesh pattern, and the read data is stored in an image RAM. The stored data is subjected to data decoding and error correction to reproduce target data. A scanning reference pattern of a mesh pattern recorded on the recording medium serves as a guide when the stored recorded data read by the image sensor is reproduced by scanning in the image RAM. A reproduction apparatus has a capability of coping with a partial destruction of the scanning reference pattern. Error checking codes are added to the recording medium in addition to the target data. These items of data are recorded as an encoded image after being subjected to scrambling processing and randomization processing. The reproduction apparatus can easily cope with an error when the encoded image is reproduced.

2 Claims, 32 Drawing Sheets

U.S. PATENT DOCUMENTS

| | | | |
|---|---|---|---|
| 4,972,497 | 11/1990 | Saito | 382/56 |
| 4,974,260 | 11/1990 | Rudak | 382/57 |
| 4,982,077 | 1/1991 | Kawamura | 235/494 |
| 5,038,393 | 8/1991 | Nanba | 382/61 |
| 5,053,609 | 10/1991 | Priddy et al. | 235/436 |
| 5,124,536 | 6/1992 | Priddy et al. | 235/436 |
| 5,126,542 | 6/1992 | Priddy et al. | 235/456 |
| 5,304,786 | 4/1994 | Pavlidis et al. | 235/462 |

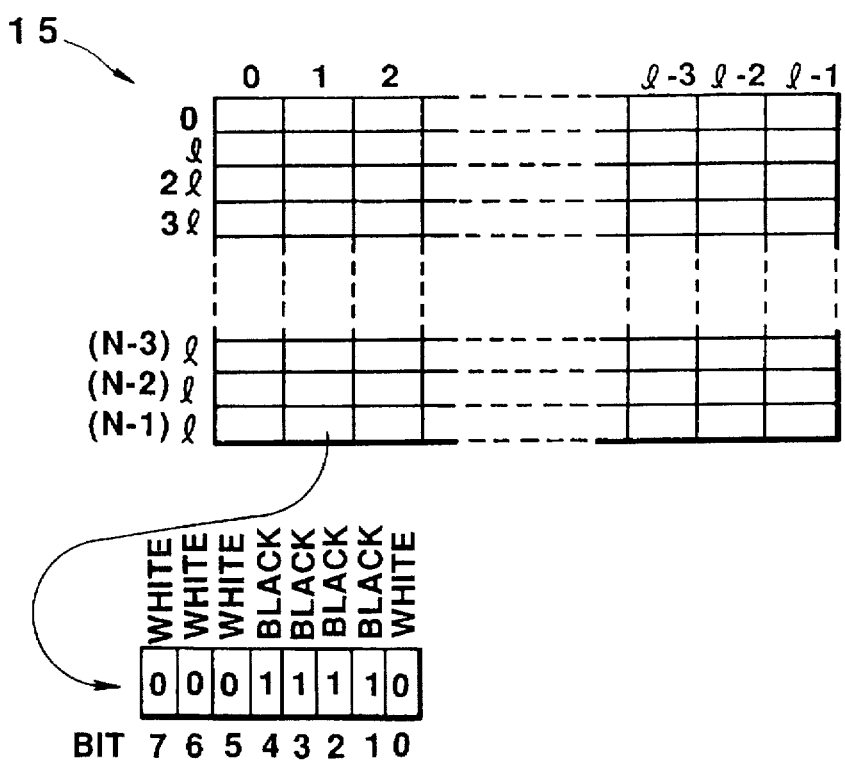
FIG. 6
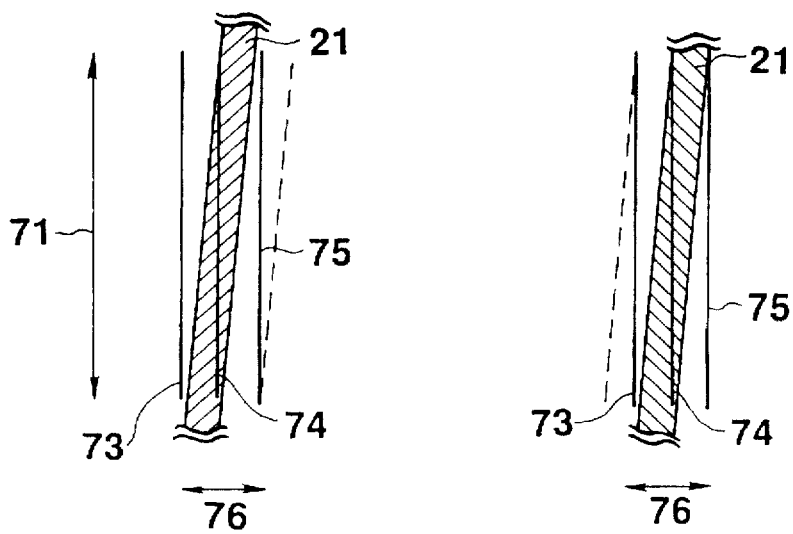
FIG. 7 (a)   FIG. 7 (b)

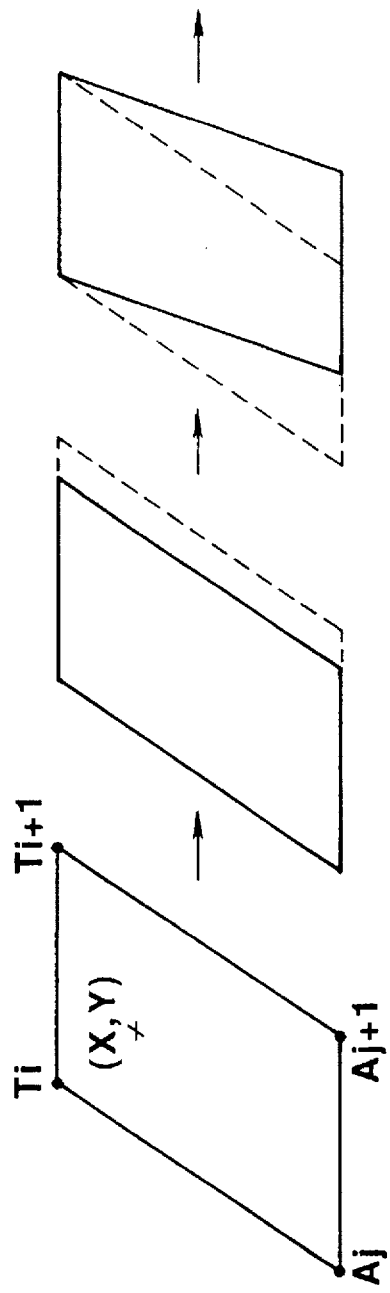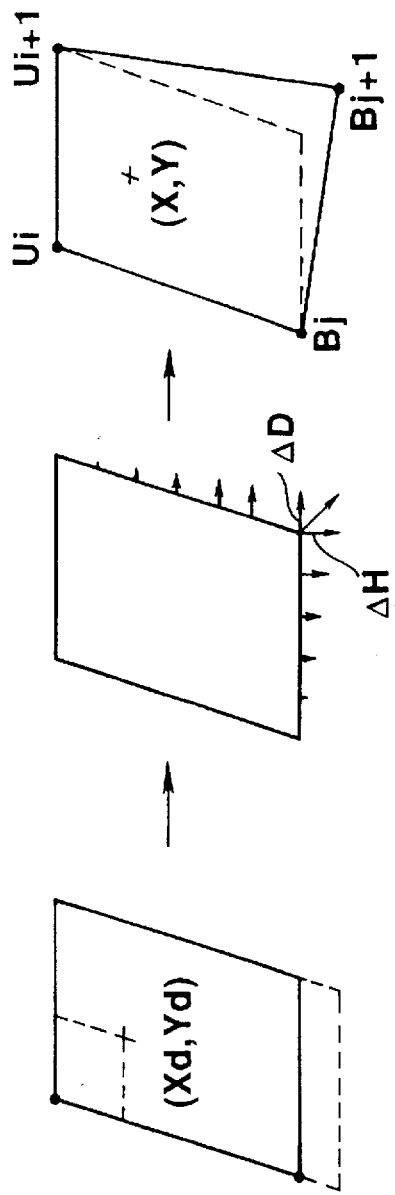
FIG.22(a) FIG.22(b) FIG.22(c)
FIG.22(d) FIG.22(e) FIG.22(f)

FIG. 25

| | | | | | | | | | |
|---|---|---|---|---|---|---|---|---|---|
| d0 | d64 | d128 | d192 | d256 | d320 | | | | d1984 |
| d1 | d65 | d129 | d193 | d257 | d321 | | d1920 | | d1985 |
| d2 | d66 | . | . | . | . | . | . | . | d1986 |
| d3 | . | . | . | . | . | . | . | . | d1987 |
| d4 | . | . | . | . | . | . | . | . | d1988 |
| d5 | . | . | . | . | . | . | . | . | . |
| d6 | . | . | . | . | . | . | . | . | . |
| d7 | . | . | . | . | . | . | . | . | . |
| . | . | . | . | . | . | . | . | . | . |
| d62 | d126 | d190 | d254 | d318 | d382 | | . | | d2046 |
| d63 | d127 | d191 | d255 | d319 | d383 | | d1983 | | d2047 |

| s0 | s8 | s16 | s24 | s32 | s40 | " | " | s240 | s248 |
|---|---|---|---|---|---|---|---|---|---|
| s1 | s9 | s17 | s25 | s33 | s41 | " | " | s241 | s249 |
| s2 | s10 | s18 | s26 | s34 | s42 | " | " | s242 | s250 |
| s3 | s11 | s19 | s27 | s35 | s43 | " | " | s243 | s251 |
| s4 | s12 | s20 | s28 | s36 | s44 | " | " | s244 | s252 |
| s5 | s13 | s21 | s29 | s37 | s45 | " | " | s245 | s253 |
| s6 | s14 | s22 | s30 | s38 | s46 | " | " | s246 | s254 |
| s7 | s15 | s23 | s31 | s39 | s47 | " | " | s247 | s255 |

| s0 | s8 | s16 | s24 | s32 | s40 | ... | s232 | s240 | s248 | p0 | p8 | p16 | p24 |
|---|---|---|---|---|---|---|---|---|---|---|---|---|---|
| s1 | s9 | s17 | s25 | s33 | s41 | ... | s233 | s241 | s249 | p1 | p9 | p17 | p25 |
| s2 | s10 | s18 | s26 | s34 | s42 | ... | s234 | s242 | s250 | p2 | p10 | p18 | p26 |
| s3 | s11 | s19 | s27 | s35 | s43 | ... | s235 | s243 | s251 | p3 | p11 | p19 | p27 |
| s4 | s12 | s20 | s28 | s36 | s44 | ... | s236 | s244 | s252 | p4 | p12 | p20 | p28 |
| s5 | s13 | s21 | s29 | s37 | s45 | ... | s237 | s245 | s253 | p5 | p13 | p21 | p29 |
| s6 | s14 | s22 | s30 | s38 | s46 | ... | s238 | s246 | s254 | p6 | p14 | p22 | p30 |
| s7 | s15 | s23 | s31 | s39 | s47 | ... | s239 | s247 | s255 | p7 | p15 | p23 | p31 |
| q0 | q4 | q8 | q12 | q16 | q20 | ... | q116 | q120 | q124 | q128 | q132 | q136 | q140 |
| q1 | q5 | q9 | q13 | q17 | q21 | ... | q117 | q121 | q125 | q129 | q133 | q137 | q141 |
| q2 | q6 | q10 | q14 | q18 | q22 | ... | q118 | q122 | q126 | q130 | q134 | q138 | q142 |
| q3 | q7 | q11 | q15 | q19 | q23 | ... | q119 | q123 | q127 | q131 | q135 | q139 | q143 |

| s0 | s8 | s16 | s24 | s32 | s40 | ... | s232 | s240 | s248 | p0 | p8 | p16 | p24 |
|---|---|---|---|---|---|---|---|---|---|---|---|---|---|
| s1 | s9 | s17 | s25 | s33 | s41 | ... | s233 | s241 | s249 | p1 | p9 | p17 | p25 |
| q0 | q4 | q8 | q12 | q16 | q20 | ... | q116 | q120 | q124 | q128 | q132 | q136 | q140 |
| q1 | q5 | q9 | q13 | q17 | q21 | ... | q117 | q121 | q125 | q129 | q133 | q137 | q141 |
| s2 | s10 | s18 | s26 | s34 | s42 | ... | s234 | s242 | s250 | p2 | p10 | p18 | p26 |
| s3 | s11 | s19 | s27 | s35 | s43 | ... | s235 | s243 | s251 | p3 | p11 | p19 | p27 |
| s4 | s12 | s20 | s28 | s36 | s44 | ... | s236 | s244 | s252 | p4 | p12 | p20 | p28 |
| s5 | s13 | s21 | s29 | s37 | s45 | ... | s237 | s245 | s253 | p5 | p13 | p21 | p29 |
| q2 | q6 | q10 | q14 | q18 | q22 | ... | q118 | q122 | q126 | q130 | q134 | q138 | q142 |
| q3 | q7 | q11 | q15 | q19 | q23 | ... | q119 | q123 | q127 | q131 | q135 | q139 | q143 |
| s6 | s14 | s22 | s30 | s38 | s46 | ... | s238 | s246 | s254 | p6 | p14 | p22 | p30 |
| s7 | s15 | s23 | s31 | s39 | s47 | ... | s239 | s247 | s255 | p7 | p15 | p23 | p31 |

FIG. 28B (600S)

| s 2*16 | s 2*16 | s 2*16 | p 2*4 |
|---|---|---|---|
| q 2*16 | q 2*16 | q 2*16 | q 2*4 |
| s 2*16 | s 2*16 | s 2*16 | p 2*4 |
| s 2*16 | s 2*16 | s 2*16 | p 2*4 |
| q 2*16 | q 2*16 | q 2*16 | q 2*4 |
| s 2*16 | s 2*16 | s 2*16 | p 2*4 |

FIG. 29A — 700

| | 0 | 1 | ... | 31 | 32 | ... | 35 | 36 | ... | 67 | 68 | ... | 71 |
|---|---|---|---|---|---|---|---|---|---|---|---|---|---|
| 0 | s0 | s8 | " | s248 | p0 | " | p24 | s4 | " | s252 | p4 | " | p28 |
| 1 | s1 | s9 | " | s249 | p1 | " | p25 | s5 | " | s253 | p5 | " | p29 |
| 2 | q0 | q4 | " | q124 | q128 | " | q140 | q2 | " | q126 | q130 | " | q142 |
| 3 | q1 | q5 | " | q125 | q129 | " | q141 | q3 | " | q127 | q131 | " | q143 |
| 4 | s2 | s10 | " | s250 | p2 | " | p26 | s6 | " | s254 | p6 | " | p30 |
| 5 | s3 | s11 | " | s251 | p3 | " | p27 | s7 | " | s255 | p7 | " | p31 |

FIG. 29B — 700S

| s 2*16 | s 2*16 | p 2*4 | s 2*16 | s 2*16 | p 2*4 |
|---|---|---|---|---|---|
| q 2*16 | q 2*16 | q 2*4 | q 2*16 | q 2*16 | q 2*4 |
| s 2*16 | s 2*16 | p 2*4 | s 2*16 | s 2*16 | p 2*4 |

FIG. 30A (table 800)

| | 0 | | 15 | 16 | | 19 | 20 | | 51 | 52 | | 55 | 56 | | 71 |
|---|---|---|---|---|---|---|---|---|---|---|---|---|---|---|---|
| 0 | s128 | " | s248 | p0 | " | p24 | s4 | " | s252 | p4 | " | p28 | s0 | " | s120 |
| 1 | s129 | " | s249 | p1 | " | p25 | s5 | " | s253 | p5 | " | p29 | s1 | " | s121 |
| 2 | q64 | " | q124 | q128 | " | q140 | q2 | " | q126 | q130 | " | q142 | q0 | " | q60 |
| 3 | q65 | " | q125 | q129 | " | q141 | q3 | " | q127 | q131 | " | q143 | q1 | " | q61 |
| 4 | s130 | " | s250 | p2 | " | p26 | s6 | " | s254 | p6 | " | p30 | s2 | " | s122 |
| 5 | s131 | " | s251 | p3 | " | p27 | s7 | " | s255 | p7 | " | p31 | s3 | " | s123 |

FIG. 30B (table 800S)

| s<br>2*16 | p<br>2*4 | s<br>2*16 | s<br>2*16 |
|---|---|---|---|
| q<br>2*16 | q<br>2*4 | q<br>2*16 | q<br>2*16 |
| s<br>2*16 | p<br>2*4 | s<br>2*16 | s<br>2*16 |
| s<br>2*16 | p<br>2*4 | s<br>2*16 | s<br>2*16 |

Figure 33:
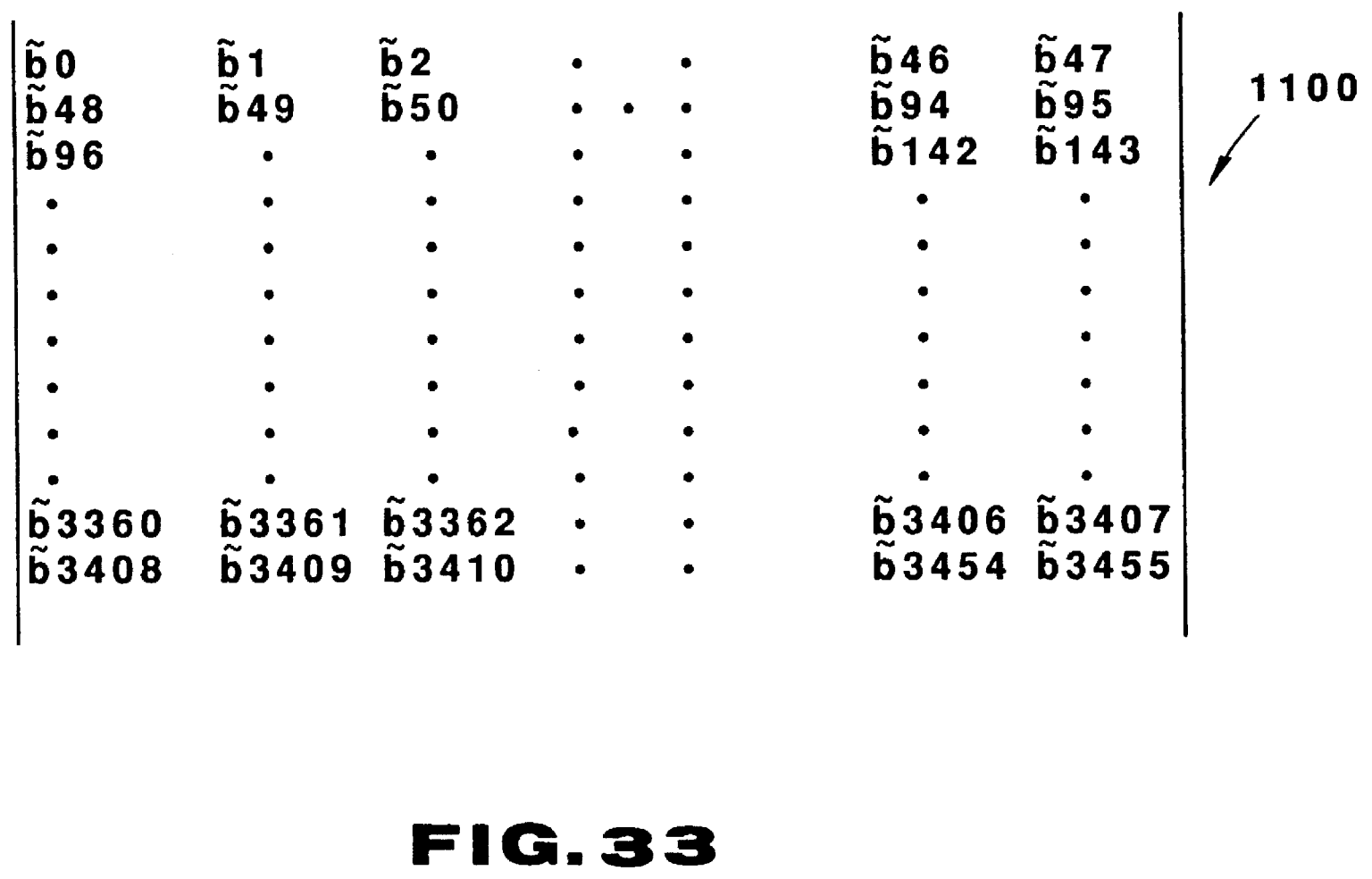

$\tilde{b}0, \tilde{b}48, \tilde{b}96, \ldots, \tilde{b}3360, \tilde{b}3408$
$b0, b48, b96, \ldots, b3360, b3408$ $\tilde{b}1, \tilde{b}49, \ldots, \tilde{b}3361, \tilde{b}3409$
$b1, b49, \ldots, b3361, b3409$ $\tilde{b}2, \tilde{b}50, \ldots, \tilde{b}3362, \tilde{b}3410$
$b2, b50, \ldots, b3362, b3410$ $\vdots$ $\tilde{b}46, \tilde{b}94, \tilde{b}142, \ldots, \tilde{b}3406, \tilde{b}3454$
$b46, b94, b142, \ldots, b3406, b3454$ $\tilde{b}47, \tilde{b}95, \tilde{b}143, \ldots, \tilde{b}3407, \tilde{b}3455$

FIG. 35

METHOD AND APPARATUS FOR
RECORDING/REPRODUCING MESH
PATTERN DATA

This is a division of application Ser. No. 07/869,012 filed Apr. 14, 1992 now U.S. Pat. No. 5,454,054, which is a Division of Ser. No. 07/530,630 filed May 30, 1990 (now U.S. Pat. No. 5,153,928).

BACKGROUND OF THE INVENTION

1. Field of the Invention

The present invention relates to a data recording/reproduction system for encoding binary data to record same as an image, and for reading a recorded image and decoding the read image into binary data.

2. Description of the Related Art

A bar code technique is known as a technique for reading an encoded image from a recording medium (recording sheet) to reproduce binary data.

For example, U.S. Pat. Nos. 4,422,361, 4,437,378, and 4,464,966 disclose this technique. However, it is difficult to increase a recording density of a bar code in terms of its structure, and the bar code is not suitable for handling a large volume of data.

Unexamined Japanese Patent Application Publication No. 53-73026 discloses a technique wherein an image in which some meshes of an i×J (e.g., 3×3) matrix are set to be black meshes, and the remaining meshes are set to be white meshes, is read to recognize a black-and-white mesh pattern. The use of the matrix encoded image can easily increase a data volume by increasing the number of meshes-included in the matrix. Another technique using a similar matrix image is also described in Magazine I/O, May, 1988, pp. 121 to 125, "Damp List Read by Image Scanner". U.S. patent application Ser. No. 07/389,287 (filing date: Aug. 3, 1989, inventors: Morikawa et al. now U.S. Pt. No. 5,042,079, assigned to the present assignee) proposes the following technique. That is, a mesh pattern obtained by encoding data by black-and-white meshes selectively formed on a mesh matrix consisting of a large number of meshes is used as a data body of an encoded image in place of a bar code, and such an encoded image is read and decoded.

According to the invention disclosed in this U.S. Ser. No. 07,389,287, since data bits are expressed by a black-and-white pattern of meshes which are two-dimensionally arrayed at small intervals, a recording density can be greatly improved.

However, when an encoded image itself on a recording medium is stained, e.g., contaminated, and a scanning reference pattern is partially deformed, omitted, or damaged thereby, the above-mentioned decoding method may erroneously recognize the contamination as a segment of the scanning reference pattern, and position errors of meshes of the mesh pattern on image data which are determined on the basis of the recognition result occur, resulting in a wrong black-and-white recognition result. For example, if a certain white clock mesh (hereinafter referred to as a clock) of a synchronous pattern as a sub-scanning reference pattern is stained in black and becomes continuous with black clocks before and after this white clock, when clocks of the synchronous pattern are detected on image data, the white clock is not read (i.e., three, i.e., black, white, and black clocks are detected as one black clock), and this error causes a decoding error of all other clocks. In this state, even if an error is detected later in error correction processing using a checking code (redundant code included in a mesh pattern), correction is impossible to achieve since the error is considerably beyond a correction capability.

A position error of a guide line as a main scanning reference caused by contamination influences a position as a central position of meshes in the vertical direction thereof obtained by equally dividing a line connecting corresponding positions of two guide lines on a scanning line image. As a result, a noncorrectable sampling error occurs later.

A recognition error of image data may occur due to various other causes. For example, the causes include a defect (caused by poor printing precision, a variation in density, or the like) of an encoded image on a recording medium, problems of an image sensor (an image resolution of the image sensor, an image distortion in image processing by the image sensor (distortion of a lens, a change in scanning speed or direction), luminance stability of a light source, a threshold level for binarizing analog image data, and photoelectric conversion characteristics of an image sensor such as a CCD), and the like.

Most of such errors are caused by the fact that a mesh pattern is adopted to increase a recording density on a recording medium. In other words, most of errors are related to the fact that an encoded image on a recording medium is constituted by a two-dimensional array of image elements encoding information units in order to effectively use a two-dimensional space on the recording medium.

SUMMARY OF THE INVENTION

It is therefore an object of the present invention to provide a data reading method and apparatus, which can detect correct positions of scanning reference patterns on image data even when scanning reference patterns of an encoded image having a mesh pattern as a data body are partially destroyed by, e.g., contamination on a recording medium.

It is another object of the present invention to provide a recording medium for recording an encoded image, which can effectively solve the above-mentioned error problems while maintaining a relatively high recording density, to provide a data recording method and apparatus for recording an encoded image on the recording medium, and to provide a data reproduction method and apparatus capable of reproducing desired data free from an error or at a low error rate from the encoded image.

According to one aspect of the present invention, image data representing an image is read from a recording medium which records the image including a mesh pattern and a main scanning reference pattern, and the read image data is divided into a plurality of partial image data segments. For each partial image data segment, a feature pixel group featuring a piece of the main scanning reference pattern included in each partial image data segment is searched from the partial image data piece. For the partial image data segment from which no feature pixel group is detected upon searching, the position of the piece of the main scanning reference pattern in that partial image data segment is determined from the position of a piece of the main scanning reference pattern represented by the feature pixel group detected upon searching of another partial image data segment. Thus, position data of pieces of the main scanning reference pattern in the image data are generated, and black and white meshes of the mesh pattern of the image data is recognized on the basis of the generated position data.

According to this aspect, even when the main scanning reference pattern on the recording medium is partially destroyed by, e.g., contamination, the destroyed portion is limited to a local area, i.e., a partial image data piece, and the unknown position of the main scanning reference pattern in this local area can be determined by positions represented by feature pixel groups obtained from other normal main scanning reference pattern segments. The positions of the main scanning reference pattern before destruction can be restored with high precision. Therefore, black and white meshes of the mesh pattern can be reliably recognized with reference to the positions of the main scanning reference pattern.

According to one preferred aspect of the present invention, the main scanning reference pattern consists of two continuous lines (guide lines) extending on both sides of a mesh pattern. As a pixel group featuring a piece of this guide line, three, e.g., white, black, and white run lengths (to be referred to as a guide line set hereinafter) which are arrayed in a depth direction of image data (in a direction perpendicular to a main scanning line image) are used. The guide line set is searched on partial image data segments of each of the two guide lines. The position of one of the guide line portions (often both guide line portions), for which search is failed is obtained by interpolation from the normal (search is successful) guide line positions before and after this line portion. Such two guide lines can cope with a change in scanning direction caused when an image sensor is manually scanned. Since the pattern itself is an elongated continuous line and has a feature which is not present in other mesh image elements, it is advantageous for recognition. Furthermore, even when images, such as characters, which are not preferable for decoding, are arranged around an encoded image, the guide lines can serve as boundaries for an encoded image.

The present invention can be applied to a main scanning reference pattern having an arbitrarily appropriate pattern. The following patterns are more preferable since recognition of the main scanning reference pattern can be facilitated: (a) a pattern having a positional feature (e.g., present outside a mesh pattern); (b) a pattern which is unique by itself, and can be easily distinguished from meshes of a mesh pattern.

A data start mark may be formed at a position (before a mesh pattern) scanned prior to a mesh pattern during scanning an encoded image by a line image sensor, and a data end mark may be formed at a position scanned after the mesh pattern. In this case, when these data start and end marks are detected from image data during a decoding operation, more reliable data decoding is assured. For example, when an end portion of a main scanning reference pattern (e.g., the above-mentioned guide line) is destroyed, if an encoded image format is determined such that the data start and end marks are located on the main scanning line or a line group crossing the end portion of the main scanning reference pattern, the destroyed end portion of the main scanning reference pattern can be determined from a line of the main scanning line image from which a piece of the data start or end mark is detected and a line estimated from detection results of undestroyed main scanning reference pattern portions.

The size (depth) of partial image data as a unit area for searching a main scanning reference pattern piece or the size of a piece to be searched may be localized according to a searching result, and may be reduced stepwise until it is almost equal to, e.g., the size of a destroyed piece. For example, when searching is unsuccessful in two continuous partial image data, a piece to be searched is halved to retry searching. In this manner, the position of the main scanning reference pattern can be determined with still higher precision.

According to another aspect of the present invention, image data representing an image is read from a recording medium which records the image including a mesh pattern and a scanning reference pattern having a synchronous mark synchronous with the mesh pattern. The synchronous mark of the scanning reference pattern is searched from the read image data. During this searching, at least one synchronous mark is detected to determine feature parameters including its position. The position of an adjacent synchronous mark is predicted from the determined feature parameters. The adjacent synchronous mark is actually measured with reference to the predicted position. The position of the actual measurement result is compared with the predicted position. When the comparison result essentially represents a coincidence, the position of the adjacent synchronous mark is determined in accordance with the actual measurement result. However, when the comparison result essentially represents a noncoincidence, the position of the adjacent synchronous mark is determined on the basis of the determined feature parameters. The prediction, actual measurement, comparison, and determination operations are repeated for all the synchronous marks, thereby generating position data of all the synchronous marks. Black and white meshes of the mesh pattern are identified based on the generated position data.

According to this aspect, a portion of the scanning reference pattern, which is destroyed by, e.g., contamination can be detected since the predicted point obtained in the prediction, actual measurement, and comparison operations does not coincide with the actually measured point. In this case, the position of the destroyed synchronous mark is determined based on already determined feature parameters (e.g., an interval or position of the synchronous mark obtained from a mark near the destroyed portion). Therefore, even when the scanning reference pattern is partially destroyed, original synchronous mark positions can be obtained with high precision. Thus, black and white meshes of a mesh pattern can be reliably identified on the basis of the obtained position data.

The scanning reference pattern may be one or both for main scanning and sub-scanning.

When a scanning direction or a scanning speed is varied during scanning of an encoded image by an image sensor, if the position of a synchronous mark is determined on the basis of an actual measurement result, the feature parameters serving as a standard for the next synchronous mark are preferably updated by the actual measurement result.

The meaning of a "position" used when an actually measured position and a predicted position are compared should have a broad sense, and the "position" can include a parameter whose value is changed in association with destruction. For example, an interval between adjacent synchronous clocks is varied when the central position of one synchronous mark is considerably changed by contamination. Thus, a predicted synchronous clock interval does not coincide with an actually measured synchronous clock interval. As for the size of a synchronous mark, a destroyed synchronous mark can be detected by comparison since its size is considerably different from a predicted size of a regular synchronous mark.

When a moving direction (sub-scanning direction) of a line image sensor for scanning an encoded image is varied during scanning, it is preferable that at least two arrays of synchronous marks arranged along an average sub-scanning direction of an encoded image are prepared, and are arranged to be separated in the main scanning direction. When the two arrays of synchronous marks are used, the synchronous marks in the two arrays of synchronous marks can have a one-to-one correspondence with each other. Therefore, by utilizing this nature, a position of a portion where a synchronous mark in one array is destroyed can be determined with high precision on the basis of an actually measured position of a corresponding synchronous mark in the other array, as well as on the basis of the relationship (position vector) between actually measured positions of adjacent normal synchronous marks in the two arrays of synchronous marks (since an interval between adjacent synchronous marks on each array can be minimized, the change is very small even if the scanning direction is changed at the interval).

According to another aspect of the present invention, in order to record, on a recording medium, an encoded image in which image elements expressing elements of data are arranged at two-dimensionally distributed positions on the recording medium, i.e., an encoded image constituted by a two-dimensional matrix of image elements representing data units, an error checking code is added to a first or original two-dimensional (data) matrix constituting target data to form a second two-dimensional matrix, and an encoded image is printed on the recording medium according to the formed second two-dimensional matrix.

Therefore, since an encoded image on the recording medium includes an image element group representing an error checking code in addition to target data which is significant as original data, the error checking code can be effectively used during data reproduction.

More specifically, in a data reproduction method and apparatus according to this other aspect of the present invention, the above-mentioned encoded image is read from a recording medium as image data, image elements are found from the read image data, data elements expressed by the image elements are obtained to form a two-dimensional data matrix, and an error on the matrix is corrected using an error checking code included in this matrix, thereby reproducing target data correctly.

Furthermore, in a data recording method and apparatus according to still another aspect of the present invention, a means for taking a countermeasure against a burst error is added to the data recording method and apparatus described earlier. The order of elements of a two-dimensional data matrix is changed so that continuous data elements on the two-dimensional data matrix obtained by adding an error checking code to target data are arranged as scattered image elements on a recording medium. An encoded image is recorded according to the two-dimensional data matrix in which the order is changed, so that a two-dimensional data matrix whose order coincides with that of the two-dimensional matrix of image elements on the recording medium is determined as one not before the order change but after the order change.

When the order of the matrix is changed (scrambled or interleaved), even if a contamination as a cause of a burst error is attached onto the recording medium, this portion corresponds to discontinuous data elements on a data matrix before the order change. Therefore, a burst error on image data can be removed during data reproduction.

More specifically, in a data reproduction method and apparatus according to still another aspect of the present invention, image elements are found from read image data to form a two-dimensional data matrix corresponding to a data matrix whose order is changed, as described above, i.e., a data matrix whose order coincides with the order of image elements on the recording medium. Thereafter, the order of the matrix is restored (descrambled or deinterleaved) to an original order, thereby forming a two-dimensional data matrix corresponding to a data matrix obtained when an error checking code is added to target data. An error on this matrix is corrected based on the error checking code included in the matrix, thereby reproducing the target data.

As a result, even if a burst error is included in a data matrix when the data matrix whose order coincides with the order of elements of an encoded image on the recording medium is obtained, the error appears at separate locations on a descrambled data matrix including the error checking code. Therefore, the error can be easily corrected based on the error checking code.

Furthermore, in a data recording method and apparatus according to a still further aspect of the present invention, when an encoded image constituted by a two-dimensional matrix of image elements which express data elements by black and white meshes is recorded on a recording medium, the values of elements on a first or original two-dimensional data matrix are changed according to a pseudo random number to form a second two-dimensional matrix (randomized data matrix) so that data elements successively having the same value on the first two-dimensional data matrix constituting given data are not recorded as image elements successively having the same density on the recording medium. The encoded image is printed on a recording medium in accordance with the formed second two-dimensional matrix.

Therefore, image elements having the same density hardly continuously appear on the recording medium, and a set of image elements, densities or gray levels of which are irregularly changed is obtained. This irregularity is advantageous for characteristics of an optical image sensor when an encoded image is read by a line image sensor, and can prevent an error caused by a change in photoelectric conversion characteristics of the image sensor caused by long portions having the same density.

In a data reproduction method and apparatus according to a still further aspect of the present invention, which reads such an encoded image, image elements are found from read encoded image data to form a randomized data matrix having data element values according to densities of the image elements, and thereafter, the values of the elements of the matrix are changed according to a predetermined pseudo random number (derandomized) to obtain a data matrix before randomization, thereby reproducing data.

BRIEF DESCRIPTION OF THE DRAWINGS

Other objects and features of the present invention will be understood for those skilled in the art from the description of the preferred embodiments of the present invention taken in conjunction with the accompanying drawings, in which:

FIG. 6 shows a memory map of an image RAM;

FIGS. 7(a) and 7(b) are views for explaining a guide line set featuring a piece of a guide line;

FIGS. 22(a) –22(f) views for explaining processing for coordinate-converting the central coordinates of meshes on a recording medium into the central position of meshes on image data;

FIG. 25 shows a bit matrix of target data;

FIG. 26 shows a symbol matrix of the target data;

FIG. 27 shows a matrix in which an error checking code is added to the target data;

FIGS. 28A and 28B show a matrix after a first scrambling operation of a data matrix with the error checking code;

FIGS. 29A and 29B show a matrix after a second scrambling operation;

FIGS. 30A and 30B show a matrix after a third scrambling operation;

FIG. 33 shows a bit matrix from which a DC component is removed, i.e., a final bit matrix;

FIG. 35 shows a symbol matrix of data with an error checking code after-symbol descrambling during data reproduction together with P and Q vectors processed in error correction processing;

DETAILED DESCRIPTION OF THE PREFERRED EMBODIMENTS

Preferred embodiments of the present invention will be described hereinafter with reference to the accompanying drawings.

First Embodiment

Figure 1:
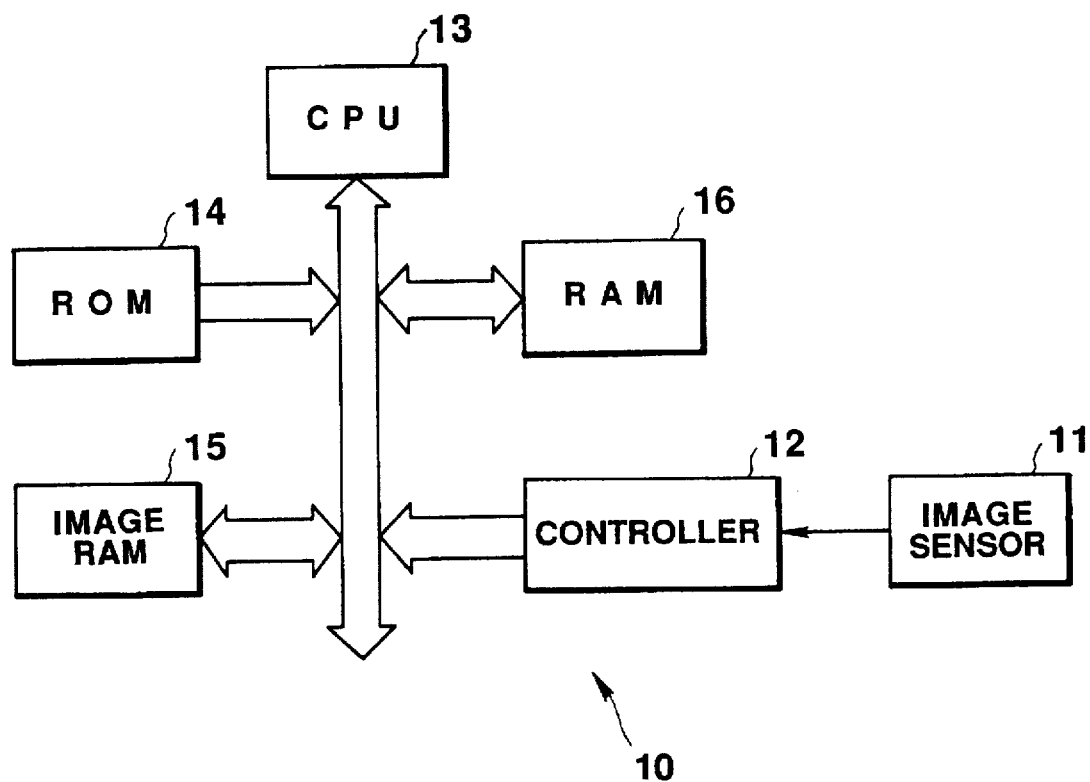
FIG. 1 is a block diagram of a data reading apparatus according to the first embodiment of the present invention.

FIG. 1 shows the overall arrangement of a data reading apparatus 10 according to the first embodiment. The object of this apparatus is to read a mesh-pattern image 20 (FIG. 2) recorded on a recording medium such as a paper sheet using an image sensor 11 and to decode data encoded in the image of FIG. 2.

The image sensor 11 comprises a manual line image sensor including a CCD sensor element array. The image sensor 11 is manually moved in a sub-scanning direction (lateral direction) of the recording medium to scan the encoded image 20 on the recording medium, thereby generating corresponding image data. More specifically, the sensor elements of the sensor array photoelectrically convert input light, i.e., input reflected light according to a black-and-white pattern of pixels on the recording medium facing the sensor elements into analog signals. Analog image outputs of the sensor elements are sequentially and cyclically derived through an analog multiplexer or the like, so that a line image output for all the sensor elements of the sensor array can be obtained for each predetermined period (main scanning period) determining a time for one main scanning line. Thereafter, the line image output is binarized by a binary circuit (e.g., a black pixel="1" and a white pixel="0"), and the binary serial image data is supplied to a controller 12 together with a timing control signal. The controller 12 controls the image sensor 11 and its peripheral circuits, and performs conversion of the input serial image data into parallel data.

A CPU 13 operates according to a program stored in a ROM 14. During scanning of an image by the image sensor 11, the CPU 13 writes parallel data in an image RAM 15 every time the serial image data is parallel-converted by the controller 12. Upon completion of the image scanning, the CPU 13 starts a decoding operation of the image data stored in the image RAM 15, and records the decoding result in a RAM 16. The decoding operation can be roughly classified into processing for recognizing a sampling reference pattern of data from the image data, and processing for identifying black and white meshes of a mesh pattern as a data body in accordance with the recognition result. According to this embodiment, even if the sampling reference pattern is partially destroyed by, e.g., contamination, the respective positions of the sampling reference pattern on the image data can be determined with high precision, and an accurate decoding result of the mesh pattern can be obtained. This will be described in detail later.

Figure 2:
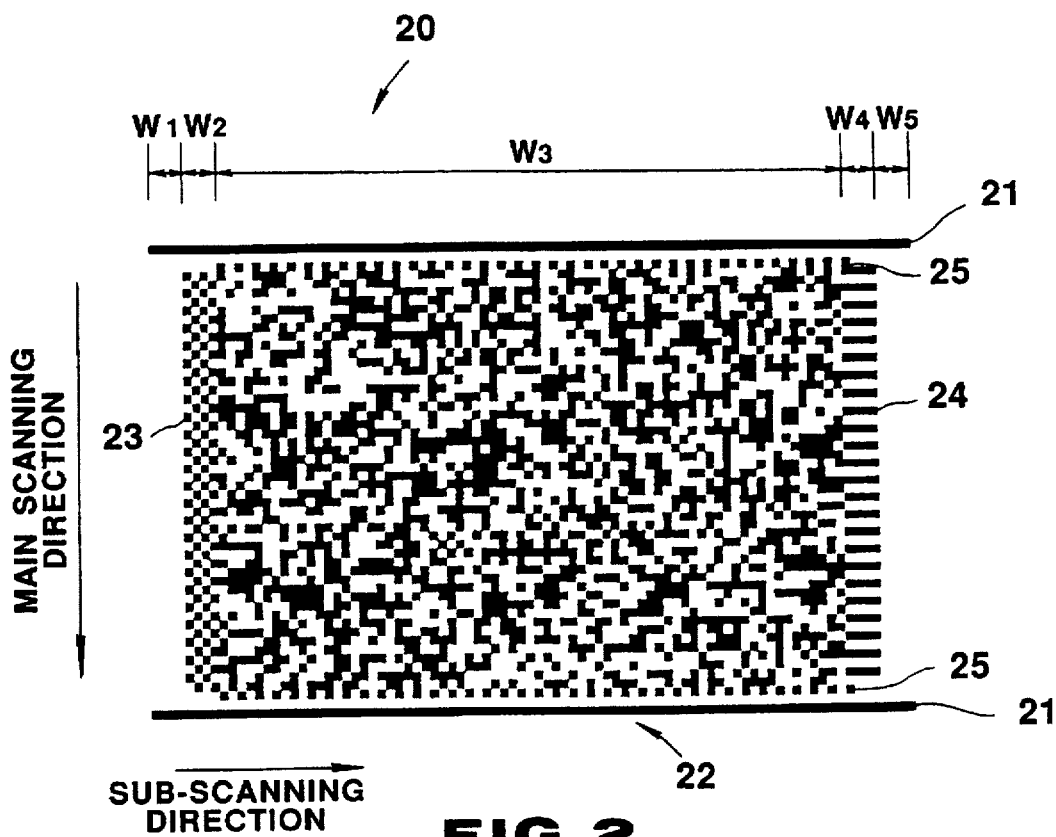
FIG. 2 exemplifies an encoded data on a recording medium as an object to be read.

FIG. 2 shows the encoded image recorded on the recording medium as an object to be read by the data reading apparatus 10. The encoded image 20 shown in FIG. 2 includes a mesh pattern 22 as a data body. The mesh pattern 22 consists of a large number of meshes arranged in a matrix. Each mesh is selectively set in black or white to express (encode) a bit as a unit of data. For example, a black mesh expresses a bit "1", and a white mesh expresses a bit "0". In FIG. 2, the mesh pattern 22 has 48×72 bit information. Furthermore, the encoded image 20 has patterns or marks for indicating main scanning and sub-scanning data sampling references for the mesh pattern 22 as a data body. In FIG. 2, the main scanning and sub-scanning sampling reference marks are separately formed. The main scanning sampling reference is defined by two guide lines 21 extending in the sub-scanning direction along the upper and lower sides of the mesh pattern. The sub-scanning sampling reference is defined by two synchronous mark arrays 25 each of which extends along the inside of the corresponding guide line 21 and has repetitive patterns of alternate black and white. An interval or pitch between adjacent black and white meshes in each synchronous mark array 25 is synchronous with, i.e., coincides with a sub-scanning interval of meshes in the mesh pattern 22. Thus, each mesh of the synchronous mark array 25 will be called a "clock" hereinafter.

The reason why the two guide lines 21 are formed as the main scanning reference patterns along the moving direction of the image sensor 11, i.e., the sub-scanning direction of the image 20 to be separated at a predetermined distance, is to cope with a case wherein the moving direction of the image sensor 11 is changed during manual, scanning of an image. More specifically, image data from the image sensor 11 is Stored in the image RAM 15 to be identified from each other in units of main scanning lines. A direction of a line image represented by each main scanning line image data cannot be clearly determined. However, when the positions of the two guide lines 21 on the main scanning line image data are detected, a position (central position of main scanning data sampling) on each main scanning line image data corresponding to the vertical central position (or may be a vertical mesh range) of meshes in the mesh pattern 22 can be determined based on the detection results in association with the positional relationship of an original image, i.e., the predetermined positional relationship formed between the two guide lines 21 and the mesh pattern 22 in the encoded image on the recording medium as an original. For example, in the image format shown in FIG. 2, the two guide lines 21 are parallel to each other, and are also parallel to the mesh pattern 22. Since a straight line connecting one point in the upper guide line 21 and one point in the lower guide line 21 passes a plurality of meshes arranged at equal intervals in the mesh pattern 22, line image data expressing an image of such a straight line should also have the same feature. Therefore, points of the two guide lines 21 are detected from the line image data, and an interval between the two points is equally divided to obtain the main scanning central position of meshes in the line image.

The synchronous mark arrays 25 as the sub-scanning reference patterns are utilized to determine the positions of meshes in the sub-scanning direction in the read image data. More specifically, clocks of the upper and lower synchronous mark arrays 25 are detected from the image data, and corresponding upper and lower clocks are checked. In the encoded image format shown in FIG. 2, a straight line connecting the centers of these corresponding clocks passes the center in the lateral direction (sub-scanning direction) of meshes in a certain column of the mesh pattern 22. Therefore, the positions of clocks in the pair of synchronous mark arrays 25 are detected from the image data, thus determining the sub-scanning central position or a sub-scanning mesh range of meshes in the mesh pattern 22 on the image data.

In the encoded image 20 shown in FIG. 2, a data start mark 23 consisting of a checkerboard mesh pattern is formed in an area scanned prior to the mesh pattern 22. A data end mark 24 in which laterally elongated black and white stripes alternately appear along the main scanning direction is formed in an area scanned after scanning of the mesh pattern 22. Thus, since the data start and end marks, 23 and 24 comprise periodic or regular patterns, they can be easily detected on the image data. Since the data start and end marks 23 and 24 respectively comprise patterns which can be easily visually distinguished from each other, a user can easily determine the scanning direction (moving direction) of the image sensor 11 with respect to the encoded image 20. Even when an end portion of the guide line 21 as the main scanning reference is destroyed by, e..g., contamination, start or end of data can be detected upon detection of the data start or end mark 23 or 24, and the destroyed position of the guide line 21 can be predicted or evaluated.

In FIG. 2, W1=W2=W4=W5. Where W1 represents a distance between a start end of the guide lines 21 and a start end of the data start mark 23, W2 a width of the mark 23, W4 a width of the data end mark 24, and W5 a distance between an end terminal of the mark 24 and ends of the guide lines 21. W3 designates the length of the data body.

Figure 3:
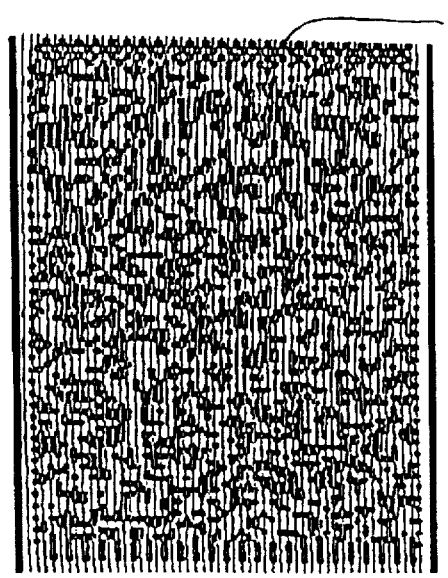
FIG. 3 exemplifies an image obtained by scanning the encoded image shown in FIG. 2 by a manual image scanner.

FIG. 3 shows an image obtained when the encoded image shown in FIG. 2 is manually scanned by the image sensor 11 relatively carefully. Even when the sampling reference pattern is partially omitted, i.e., when the guide lines 21 or the synchronous mark arrays 25 are slightly destroyed, the apparatus of this embodiment can cope with this and can provide a correct decoding result as long as a read image is distorted to a degree as shown in FIG. 3.

Image data decoding processing according to this embodiment will be described below.

Figure 4A:
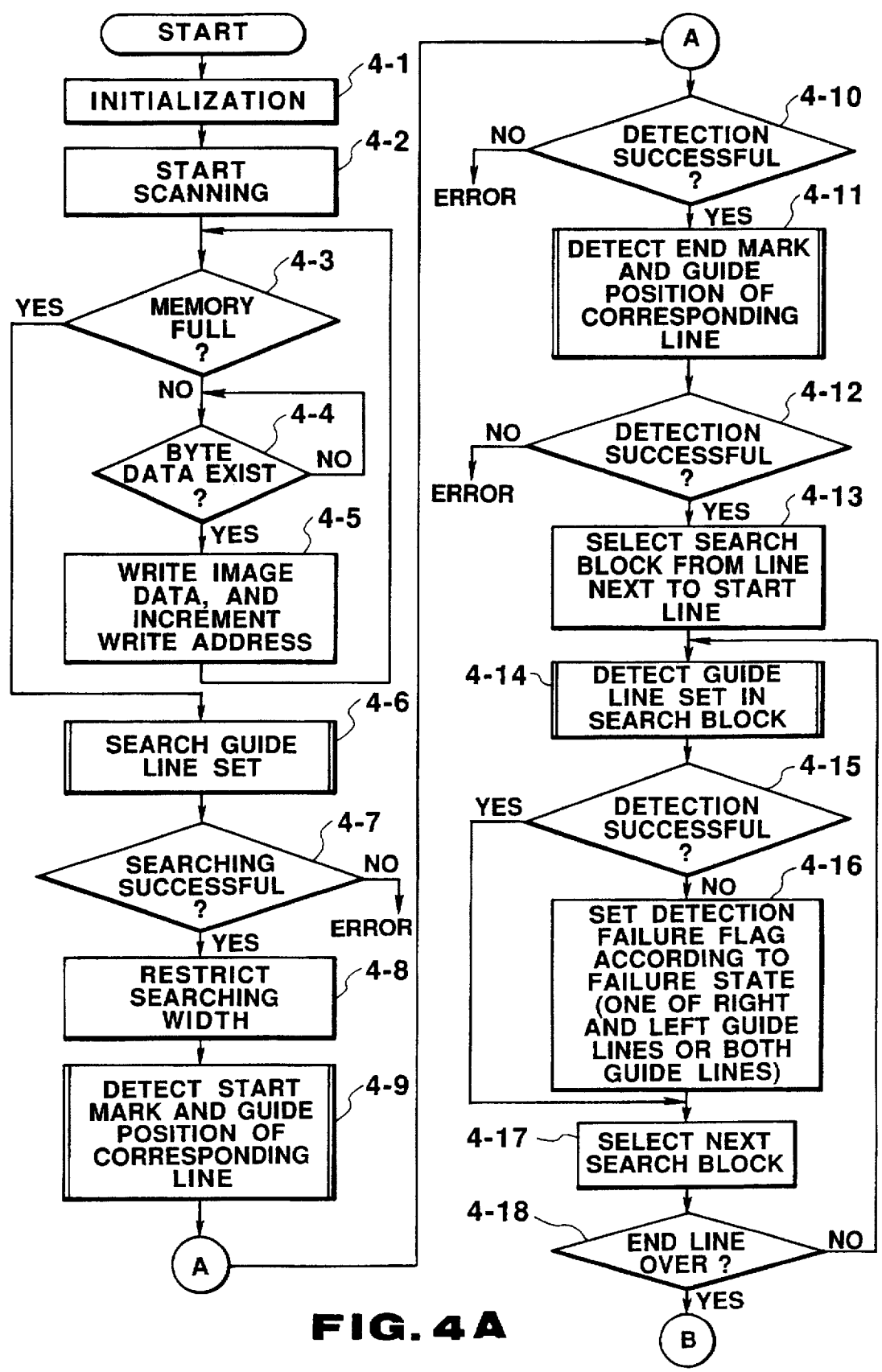
FIGS. 4A and 4B show a flow chart for storing image data obtained by scanning an encoded image, and recognizing a guideline as a main scanning reference pattern from the stored image data to perform main-scanning decoding.
Figure 4B:
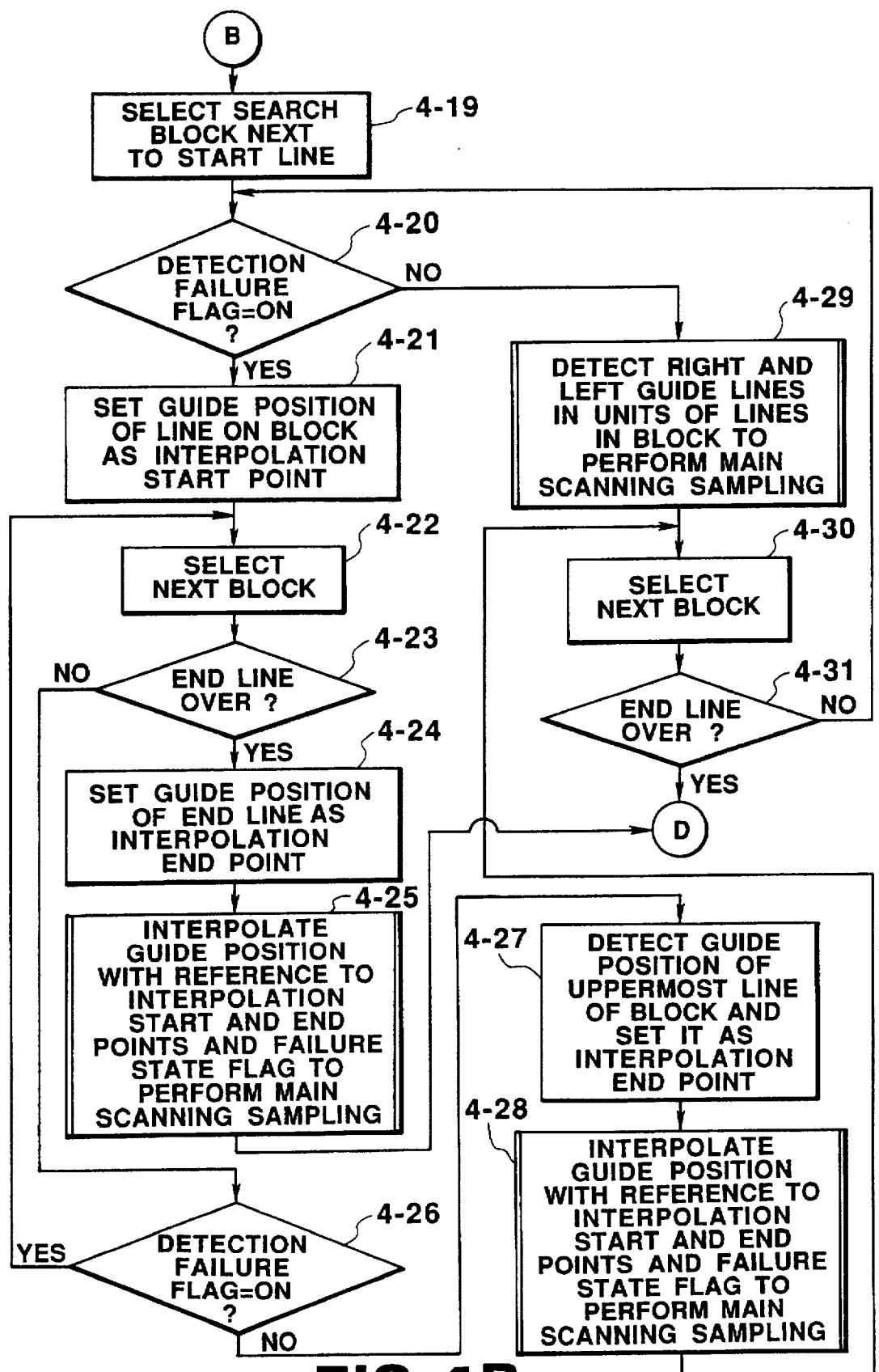
Figure 5A:
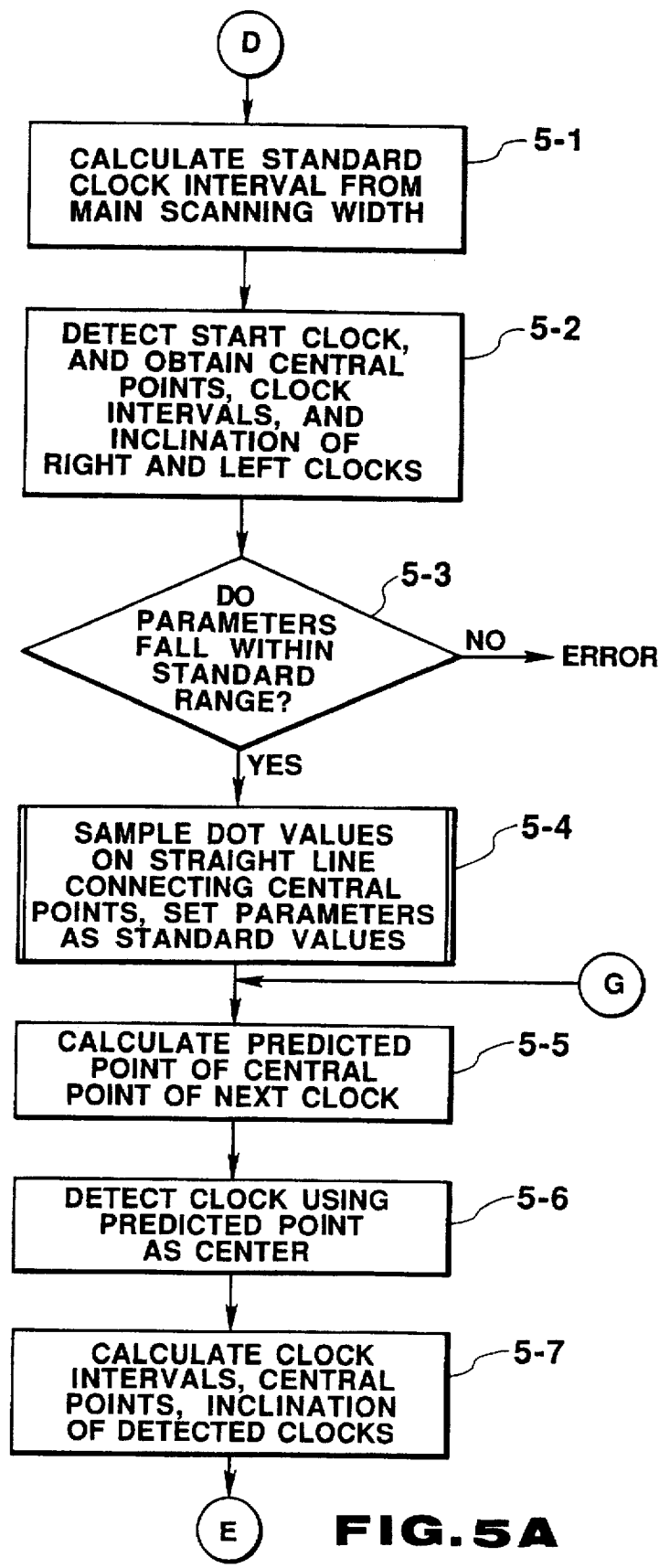
FIGS. 5A and 5B show a flow chart for recognizing a synchronous mark array as a sub-scanning reference pattern from the main-scanning decoded image data to perform sub-scanning decoding.
Figure 5B:
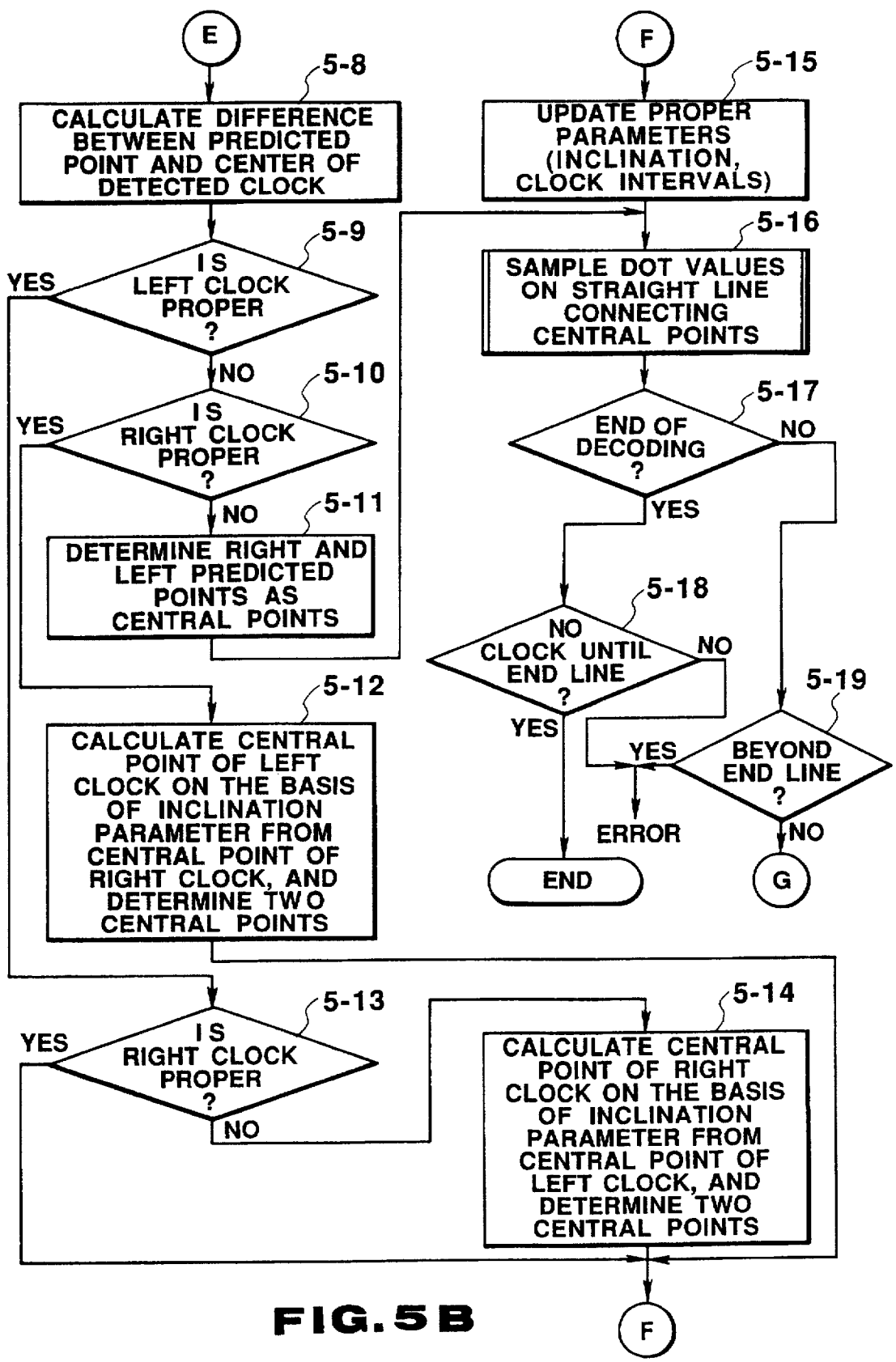

FIGS. 4A and 4B show a flow chart of processing for storing image data obtained by scanning the encoded image 20, and recognizing the guide lines 21 as main scanning reference patterns from the stored image data, thereby main-scanning sampling image data. FIGS. 5A and 5B show a flow chart of processing for recognizing the synchronous mark arrays 25 as the sub-scanning reference patterns from the main-scanning sampled image data, and sub-scanning sampling the image data. This embodiment has a characteristic feature in recognition of the guide lines 21 and the synchronous mark arrays 25. Even when the guide lines 21 or the synchronous mark arrays 25 are slightly destroyed, the destroyed position can be determined with high precision.

In steps 4-1 to 4-5 in FIG. 4A, the encoded image 20 on the recording medium is read by the image sensor 11, and the read image data is written in the image RAM 15. A scanning end condition (memory full) in step 4-3 is merely an example, and scanning end may be determined in response to various other appropriate events. The image RAM 15 is assumed to comprise a byte memory as in step 4-4. FIG. 6 shows a memory map of the image RAM 15. A one-line image (line image) is written in one of l horizontal lines (l successive addresses of the image RAM 15) in FIG. 6.

Figure 8:
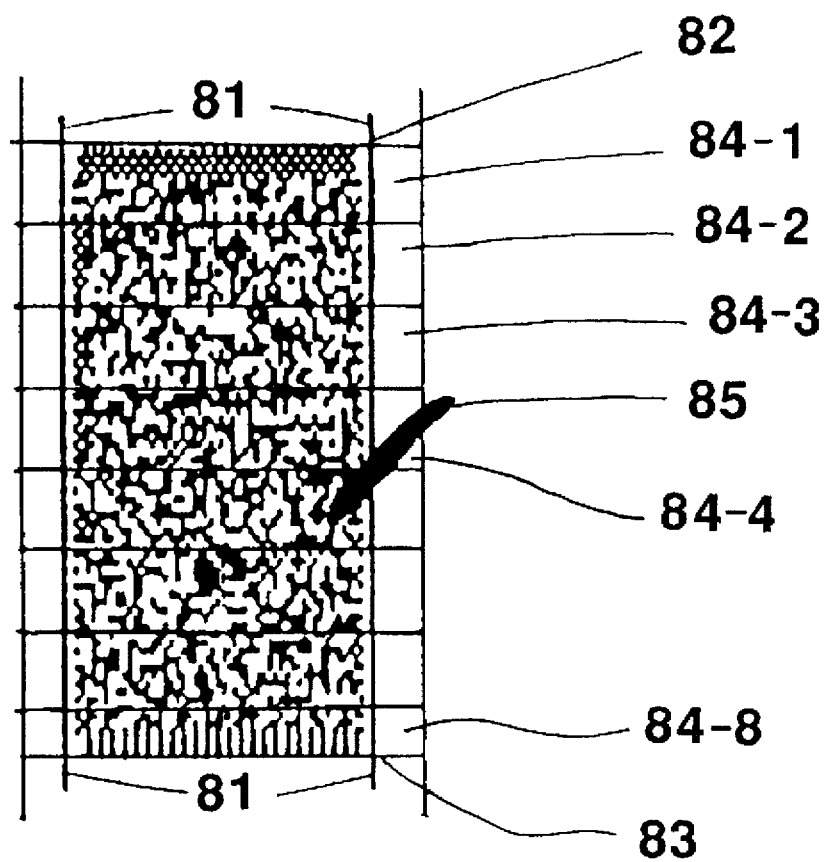
FIG. 8 shows an encoded image around which characters are present, and a plurality of search blocks obtained by dividing the encoded image.

The image decoding operation starts from step 4-6 in FIG. 4A. In step 4-6, a guide line set (pixel group featuring the guide line as the main scanning reference) is searched from the entire image data stored in the format shown in FIG. 6. As shown in FIG. 2, the guide line 21 is a black continuous line, and has a feature which is not present in other elements of the encoded image 20. Therefore, for example, the guide line set can be defined by three, i.e., white, black, and white parallel run lengths 73, 74, and 75 having an appropriate interval, as shown in FIGS. 7(a)–7(b). An initial value of an interval or width 76 of the run lengths necessary for finding the guide line set may employ a fixed standard limit value or may be determined by measuring the widths of black or white meshes which most frequently appear in a line image. The guide line set defined by the three appropriate run lengths 73, 74, and 75 can be searched as follows. That is, an image is traced from the positions of white, black, and white meshes having an appropriate interval on an appropriate line image on the image RAM 15 in a depth direction (vertical direction in FIG. 6) perpendicular to the line image to detect the numbers of successive white, black, and white meshes (run lengths), and the detection results are compared with a condition of the guide line set. This processing is repeated. When searching is unsuccessful, an error occurs since decoding is impossible (4–7). However, when searching is successful, the width of the guide line and the standard value of an inclination of the scanning direction are determined based on the information of the guide line set. In step 4-8, margins taking a variation from the standard value of the inclination of the scanning direction into consideration are added to the right and left (upper and lower in FIG. 2, but "right and left" will be used according to FIG. 6) guide line set positions, thereby determining right and left searching areas (searching widths 81 in FIG. 8) of image data in the following processing. It is necessary to define the searching widths 81 when images such as characters and the like (which may cause noise during decoding) are present around the encoded image 20, as shown in FIG. 8. However, this processing is not necessary when a blank space is formed around the encoded image 20.

In steps 4-9 to 4-11, processing for defining a searching area of image data in a depth direction is executed. For this purpose, the data start and end marks 23 and 24 are detected to obtain left and right guide line positions where these marks 23 and 24 are detected. The data start and end marks 23 and 24 can be detected by detecting a line image including periodic black and white patterns. For example, in the encoded image shown in FIG. 2, the following simple condition for detecting these marks can be sufficiently used. That is, since each of the start and end marks 23 and 24 consists of 24 pairs of black and white repetitive patterns, when about 20 pairs of black and white patterns having the same cycle are found in consideration of a margin, it can be determined that these marks are detected. The data start mark 23 is preferably searched from an upper line (first line) of the image data, and the data end mark 24 is preferably searched from a lower line (last line) of the image data. When the start or end mark 23 or 24 cannot be detected, error processing is executed since it can be considered that the error is caused by an erroneous operation such as partial scanning of the encoded image 20 (4-10 or 4-12).

In steps 4-13 to 4-18, image data in which the searching width 81 and the searching depth (from a start line 82 to an end line 83 in FIG. 8) are defined by the above-mentioned processing is divided into a plurality of partial image segments in the depth direction, which are called searching blocks, and whether or not the guide line in each segment is destroyed is checked. In FIG. 8, the image data is divided into eight searching blocks 84. The size (depth) of the searching block is determined in step 4-13, and the first searching block starting from the line next to the start line 82 is selected. The depth of the searching block can be determined in consideration of the guide line set information obtained in step 4-6, a processing time, precision, and the like, and this value determines a necessary length of the white, black, and white run lengths associated with the guide line set searched in step 4-14. More specifically, when run lengths having an appropriate interval and having a length equal to or larger than the depth of the searching block are detected as the white, black, and white run lengths in the depth direction, it can be determined that the guide line sets are present, and data representing their positions (a rectangular area surrounded by the guide line sets) is stored. When searching is unsuccessful, since it indicates that the guide lines of the searching block are damaged, a flag according to an unsuccessful state indicating for which one of the right and left guide lines searching is unsuccessful or that searching is unsuccessful for both the guide lines is set so that guide line positions can be interpolated later (4-15, 4-16). For example, in FIG. 8, since a contamination 85 is attached to the right guide line portions of the fourth and fifth searching blocks from above, the right guide line portions in these searching blocks are detected as errors.

After the state of the guide lines is checked for one searching block, the next searching block is selected (4-17), and checking is repeated until the last searching block at the end line 83 (4-18) is checked.

Although not executed in the flow shown in FIG. 4A, the size of each searching block may be variably localized according to the searching result. For example, if a guide line error is detected in a certain searching block in step 4-15, the depth of the searching block is halved, so that guide line searching is executed for the two half-depth searching blocks again or the loop including steps 4-13 to 4-18 may be restarted using half-depth searching blocks.

Figure 10:
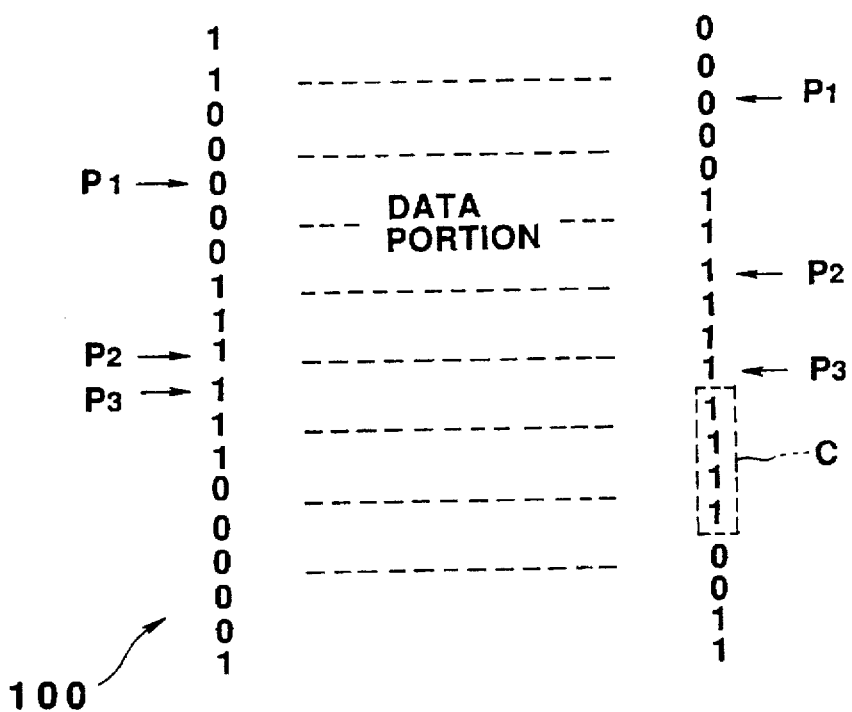
FIG. 10 shows main-scanning decoded image data corresponding to the image shown in FIG. 9.

From step 4-19 to the last step 4-31 in FIG. 4B, the right and left guide line positions in each main scanning line image are determined for each searching block, and a main scanning sampling position of each line image (the entire path of the sampling positions is denoted by reference numeral 31 in FIG. 3) is obtained by an equal dividing method. Image data bits (pixels or meshes) at the sampling positions are extracted from the line images to form main-scanning decoded arrays 100 (FIG. 10). The guide line positions (central positions in the guide line widths) on each main scanning line image are determined by actual measurement when no failure flag indicating an error or destruction is set for the guide line portions of a searching block to which the main scanning line image belongs. However, when the failure flag is set, the guide line positions are determined by interpolation based on other guide line positions actually measured from normal guide line portions. For example, as shown in FIG. 4B, a list of failure flags are looked up, and guide line positions in a main scanning line image of interest can be obtained by linear interpolation from Guide line positions in main scanning line images at the ends of previous and following searching blocks.

According to the flow of FIG. 4B, NO is determined in step 4-20 when both the right and left guide line portions of a current searching block are correct (it can be determined since the corresponding failure flags are reset). In this case, the central positions of the right and left guide line portions of each main scanning line image in the current searching block are actually measured in step 4-29, and an equally divided position according to the encoded image format between the two central positions is then obtained as a main scanning sampling point. Thereafter, an image bit at each sampling point is extracted. If it is determined in step 4-20 that the failure flag of at least one of the right and left guide line portions is set, the flow advances to step 4-21 and subsequent processing. In order to interpolate the guide line position for which the failure flag is set, the guide line position immediately preceding the current searching block, i.e., the guide line position in the last main scanning line image in the previous searching block (or the guide line position of the start line obtained in step 4-9 if the current searching block is the first searching block) is determined as an interpolation start point (4-21). A searching block including normal guide line portions is searched from the following searching blocks (4-22, 4-26), and the guide line position in the uppermost main scanning line image in the normal searching block is detected as an interpolation candidate (4-27). The guide line positions on the main scanning line images in the searching block of interest present between the interpolation start and end points are determined by interpolation, and main-scanning sampling is then executed (4-28). Although not shown in the flow, when one guide line portion in a certain searching block is normal, its position is directly measured. When a guide line portion near the end line is destroyed, the guide line position evaluated in step 4-11 is used as an interpolation end point (4-23, 4-24).

A guide line section including an error is interpolated on the basis of the positions actually measured in other normal guide line sections, thus executing high-precision main-scanning sampling. As a result, the arrays of the main-scanning decoded image data 100 are completed, as shown in FIG. 10. Columns on two sides of the main-scanning decoded image data 100 are linear image mesh arrays extending along the main scanning center path 31 (FIG. 3) of the synchronous mark arrays 25 as the sub-scanning scanning reference patterns. In the flow chart of FIGS. 5A and 5B, the mesh arrays of the right and left synchronous mark arrays 25 are checked to determine the sub-scanning central positions of the clocks in the synchronous mark arrays 25, and the mesh pattern 22 is then subjected to sub-scanning data sampling to identify black and white levels of meshes.

In step 5-1 in FIG. 5A, the length in the depth direction of a clock serving as a standard value (comparison reference value) of the start clock in step 5-3 is determined on the basis of the main scanning width, i.e., an interval between the right and left guide lines 21 (obtained in FIGS. 4A and 4B). In this embodiment, the image sensor 11 is assumed to be manually scanned on the encoded image 20, and a clock length may be Considerably varied. Therefore, a relatively large margin must be added to the standard value. Note that in place of calculating the standard value from the main scanning width, the mesh arrays of the synchronous mark arrays 25 on the main-scanning decoded image data 100 are checked to obtain an average black or white run length, and the obtained run length may be used as the standard value. In step 5-2, the first (black) clocks of the right and left synchronous mark arrays 25 on two sides are detected from the mainscanning decoded image data, and their central points, lengths, an inclination between the right and left first clocks with respect to the main-scanning direction of the image data 100 (horizontal direction in FIG. 10), and the like are actually measured. In step 5-3, it is checked if the clock length of the measurement results falls within the range of the standard value obtained in step 5-1. When the clock length does not fall within the range of the standard value at this time, a read error occurs. When the clock length falls within the range of the standard value, values of meshes on a straight line connecting the central positions of the right and left start clocks are extracted from the main-scanning decoded image data 100 to obtain data representing black and white levels of meshes of the first column in the mesh pattern 22 in order to perform sub-scanning sampling. In addition, the feature parameters (the central positions, the lengths, the inclination, and the like) are set as the standard values for the next clocks.

Figure 9:
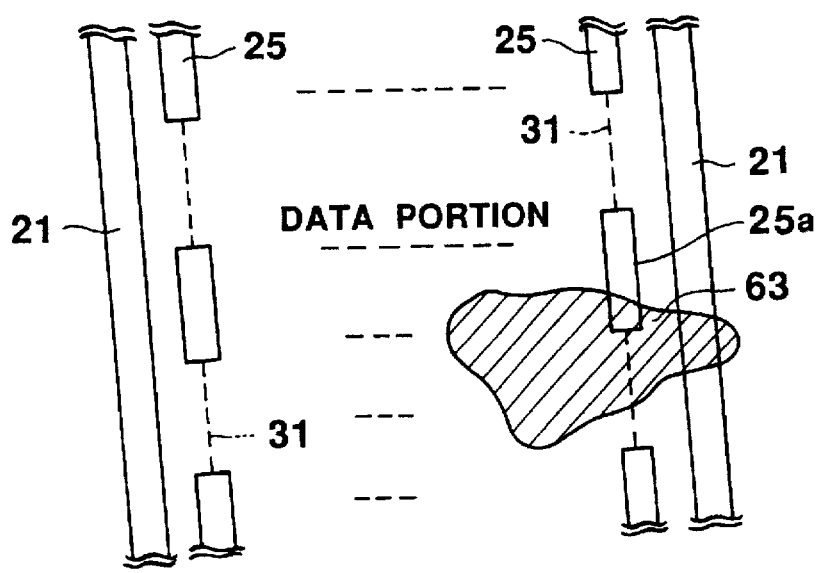
FIG. 9 exemplifies an image including a contaminated guide line and a synchronous mark array.

In step 5-5, the length of the previous clock is added to the central position of the previous clock to predict the central position of the next clock. In this embodiment, this prediction can be made since the synchronous mark arrays of the encoded image 20 (FIG. 2) comprise repetitive patterns of black and white clocks having the same length, and hence, the clock length is equal to the clock interval. In step 5-6, searching is vertically performed from this predicted point along the mesh array of the synchronous mark array on the main-scanning decoded image data until a mesh value different from that of the predicted point is detected, thereby actually measuring the next clock. For example, if the predicted point is "1" representing a black pixel, vertically successive "1"s having the predicted point as the center are determined as the next clocks. The length, the center, an inclination between the right and left clocks, and the like of the next clocks are obtained as actual measurement results (5-7). When prediction and actual measurement are executed in this manner, if a clock includes no error, the predicted central point and the actually measured central point should fall within a predetermined range. However, if the clock is destroyed, its clock length and inclination must be considerably changed from the standard values (the length of the previous clock and the inclination between the previous right and left clocks), as shown in FIGS. 9 and 10. In FIG. 9, since a contamination 63 paints a black clock 25a of the right synchronous mark array 25, a black mesh array indicating a piece of the contamination 63 surrounded by a meshed line C in FIG. 10 is formed in the mesh array (pixel array on the scanning path 31 shown in FIG. 9) of the synchronous mark array 25 on the main-scanning decoded image data 100 shown in FIG. 10. Therefore, the length of the next clock is observed to be longer by the contamination than that of the previous clock (white clock and its actual measurement center is indicated by P1 in FIG. 10) in the mesh array of the right synchronous mark array 25. A predicted center P2 of the next clock is largely deviated from an actually measured center P3. Since a corresponding portion of the right synchronous mark array 25 has no contamination, a difference between a center P2 predicted from the previous clock (its center is indicated by P1) and an actually measured value P3 of the next clock is very small if there is any. Therefore, the feature parameters predicted for the next clock are compared with actually measured feature parameters, and a difference therebetween is checked to detect a clock error caused by, e.g., contamination. In the flow chart of FIG. 5B, a difference between the predicted central point of the next clock and the actually measured central point of the next clock for each of the right and left synchronous marks is obtained (5–8), and it is checked if the difference falls within an allowable range (5–9, 5–10, 5–13), thereby discriminating whether or not the next clock is proper. Step 5-11 is executed when neither the right nor left clocks are proper. In this situation, since only the previous state of the synchronous mark array 25 is reliable, the right and left predicted points obtained in step 5-5 are determined as the central points of the next clocks. In step 5-16, a mesh array on a straight line connecting the central points is sampled from the main-scanning decoded image data 100, and the sampled data array is determined as data indicating black and white levels of associated meshes. Steps 5-12 and 5-14 are executed when one of the right and left next clocks is proper, and the other is not proper. In this case, the central point of the improper clock may employ a predicted point from the previous clock. However, in order to improve precision, the central point of the improper clock is obtained from the actually measured central point of the proper clock on the basis of the inclination. For example, the inclination of right and left proper white clocks observed in an upper portion of FIGS. 9 and 10 can be evaluated by a vertical difference of 2 (meshes) between the central points P1 of right and left clocks. Of black clocks located immediately below these two white clocks, the right black clock is improper, and the left black clock is proper. The central point of the left black clock is actually measured as P2 in FIG. 10. Therefore, a position two meshes above an intersection between a horizontal line passing through the actually measured point and a straight line as the mesh array of the right synchronous mark array 25 (in this case, this position fortunately coincides with the position P2 predicted from the center P1 of the right previous clock) is determined as the central point of the right improper clock. In step 5-15, only the clock length of the proper clock is updated as the standard value of a clock interval. In step 5-16, a mesh array between the centers of the right and left clocks is sampled. When both the clocks are proper, the actually measured clock centers are settled, and a mesh array therebetween is extracted. In this case, all the standard parameters are updated by feature parameters of the actually measured clocks in step 5-15.

In step 5-17, end of decoding is checked. In this step, the number of data determined according to the format of the encoded image is compared with the number of execution times of decoding step 5-16. When the number of execution times of step 5-16 is equal to the number of data determined by the format, and the mesh array of the following synchronous mark array 25 does not include a clock up to the end line (5-18), i.e., when the number of clocks determined by actual measurement or interpolation from the mesh array of the synchronous mark array 25 on the main-scanning decoded image data 100 is equal to the number defined by the format, it is determined that proper processing operations are executed, thus completing sampling processing. When erroneous clock interpolation or the like is executed during sampling processing, the end line of the image data arrays 100 is reached before the number of data defined by the format is obtained (NO in step 5-19), or another clock is found after the number of data defined by the format is obtained (NO in step 5-18). Thus, an error can be detected.

As described above, according to the first embodiment, sampling reference patterns (the guide lines 21 and the synchronous mark arrays 25) included in the encoded image 20 are improved in consideration of reading of the encoded image 20 under a considerably strict environmental condition, e.g., a change in scanning speed or direction during scanning which often occurs since the encoded image 20 is manually scanned by the image sensor 11, characters and the like which cause noise and are recorded around the encoded image 20, and the like. In addition, a countermeasure against a case wherein the sampling reference patterns are partially destroyed is taken in recognition of the sampling reference patterns in the read image data. That is, for the guide lines 21 as the main scanning reference patterns, measurement of the positions of the guide lines 21 in a portion other than the destroyed portion is allowed by a segment method, and the guide line position of the destroyed portion is interpolated based on the obtained position information. For the synchronous mark arrays 25 as the sub-scanning reference patterns, the positions of the clocks are obtained by prediction based on feature parameters of an adjacent clock, actual measurement from the predicted point, comparison between the actual measurement result and the prediction result, and predetermination of a position whose comparison result indicates a clock error. Therefore, the positions of the sampling reference patterns can be determined from image data with higher precision even in a relatively strict use environment, e.g., the presence of misleading characters, a variation in scanning direction, contamination, and the like, and black and white levels of meshes of the mesh pattern can be identified with high precision on the basis of the determination result.

Second Embodiment

Figure 11:
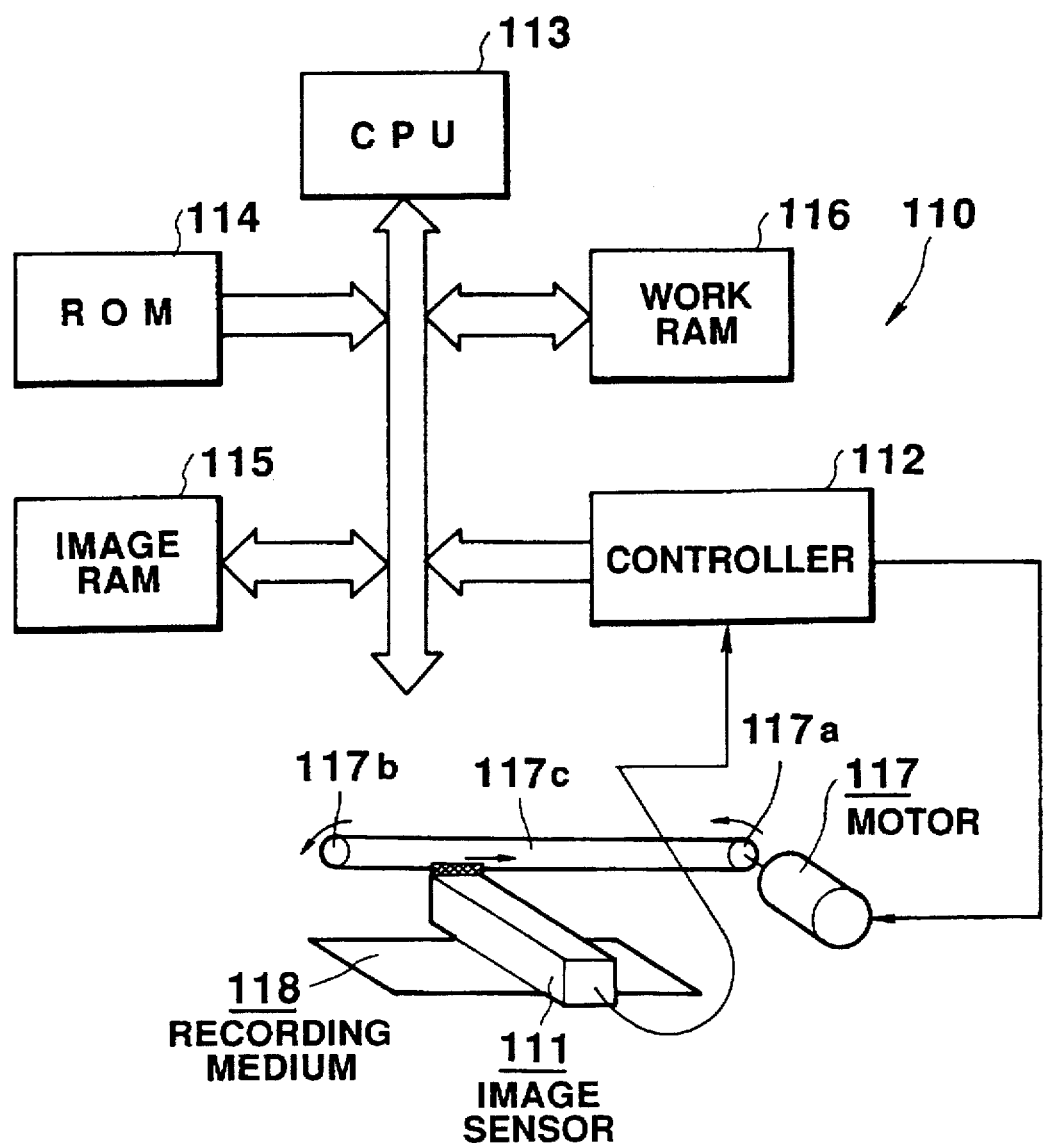
FIG. 11 is a block diagram of a data reading apparatus according to the second embodiment of the present invention.
Figure 12:
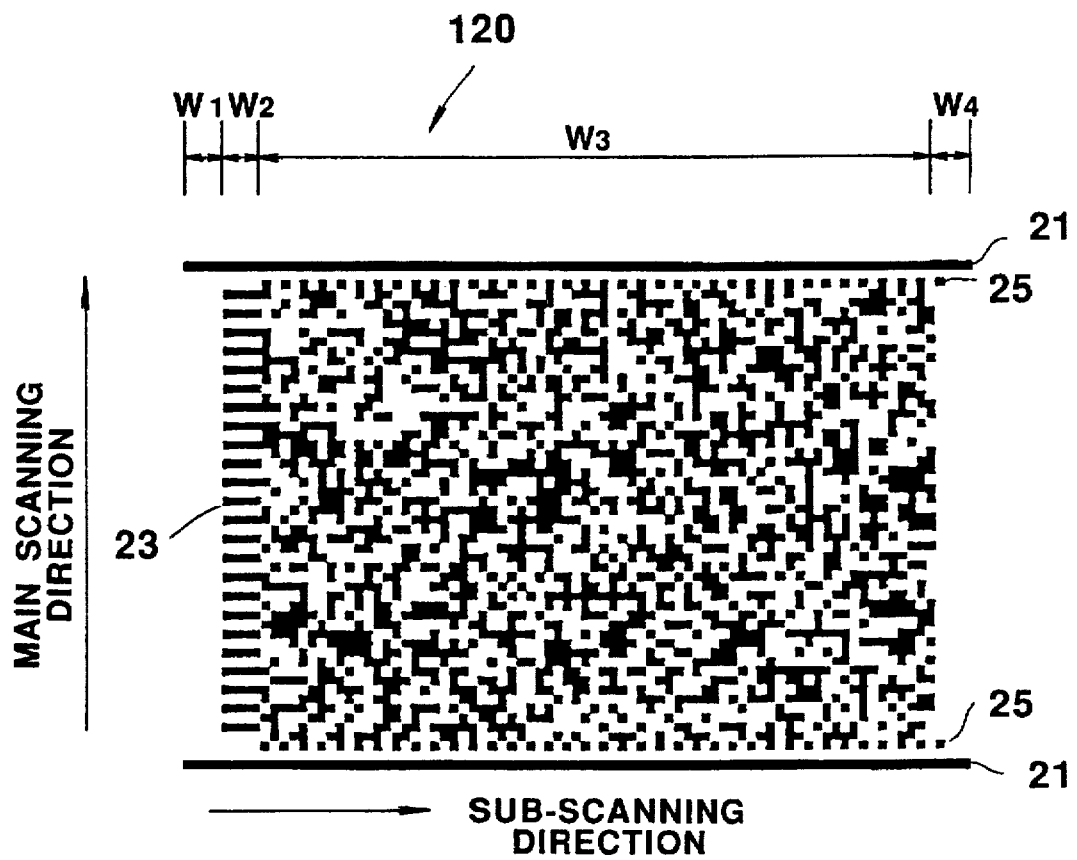
FIG. 12 shows an encoded image having no data end mark.

FIG. 11 shows the overall arrangement of a data reading apparatus 110 according to the second embodiment of the present invention. In this embodiment, an image sensor 111 mechanically scans a recording medium 118. As shown in FIG. 11, a controller 112 drives a stepping motor 117. The stepping motor 117 moves the image sensor 111 via pulleys 117a, 117b and a belt 117c along a predetermined path, e.g., a rail. With this arrangement, since variations in moving speed and direction of the image sensor 111 are considerably reduced as compared to a manual operation, a distortion of read image data can be remarkably reduced (such a merit is attained even when the motor 117 is not controlled by a special servo mechanism or the like). Therefore, by utilizing this nature, some of constituting elements and processing operations described in the first embodiment can be facilitated or omitted. For example, even if an encoded image 120 having no data end mark shown in FIG. 12 is used, the number of lines below a data start mark 23 until data ends can be roughly predicted based on a precise scanning speed of the image sensor 111. Even if the size of each searching block is increased, the position of a destroyed guide line portion can be interpolated with high precision. In recognition processing of synchronous mark arrays 25 as sub-scanning reference patterns, not local parameters, e.g., feature parameters of an immediately preceding clock but global parameters averaged from the entire image can be used as comparison standard values. Thus, the position of the next clock can be predicted and evaluated based on the global parameters with high precision.

Another Arrangement

The first and second embodiments have been described above. Various changes and modifications of the present invention may be made within the spirit and scope of the invention.

The data start and end marks 23 and 24 described in the first embodiment are effectively used to predict their corresponding portions (executed in steps 4-9 and 4-11 in FIG. 4A) when the corresponding portions of the marks are destroyed. However, the normal functions of the marks 23 and 24, i.e., the functions of indicating start and end of data can be realized without using these marks. For example, if the data start and end marks 23 and 24 are omitted from FIG. 2, successive white pixels appear between black pieces of the two guide lines 21 in a main scanning line image obtained by scanning these portions (white portions), thus detecting start and end of data.

Figure 13:
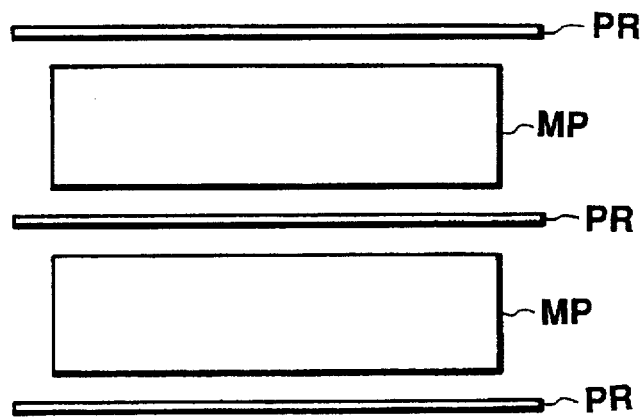
FIG. 13 is a schematic view of an encoded image with three guide lines.
Figure 14:
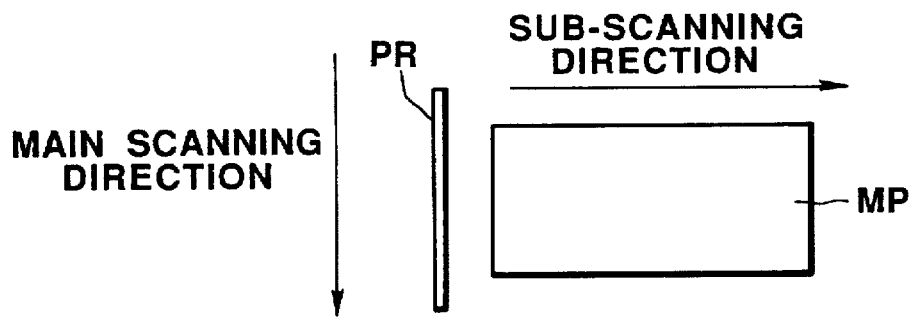
FIG. 14 is a schematic view of an encoded image with one guide line.

In the above embodiments, the two guide lines 21 are arranged outside the mesh pattern 22 as the main scanning reference patterns in the encoded image 20 or 120. However, various other appropriate main scanning reference patterns may be used. For example, as shown in FIG. 13, when three (or more) parallel guide lines PR are used as main scanning reference patterns for a mesh pattern MP, when the guide lines PR is partially destroyed, the guide line position can be more strongly restored. For example, when one of the three guide lines PR is partially destroyed, the destroyed guide line portion can be accurately determined based on the corresponding positions of the remaining two guide lines. As exemplified by the central guide line PR in FIG. 13, a main scanning reference pattern may be arranged in the mesh pattern 22. When the scanning direction of the image sensor is stable, the main scanning reference pattern may be constituted by one guide line PR extending along the main scanning direction of the mesh pattern MP, as shown in FIG. 14. In this case, the scanning direction (moving direction) of the image sensor can be determined by checking a main scanning line image passing through the guide line PR. By checking the main scanning line image, the end position of the guide line PR can be determined. Thus, the central position of each mesh in the main scanning direction on the read image data can be determined on the basis of the above determination result and the positional relationship between the end points of the guide line PR determined as an image format and meshes of the mesh pattern MP, thus executing main scanning sampling. Furthermore, it is advantageous that the main scanning reference pattern comprises a continuous line in black or in a color different from surrounding colors, but may comprise a discontinuous mark.

Figure 15:
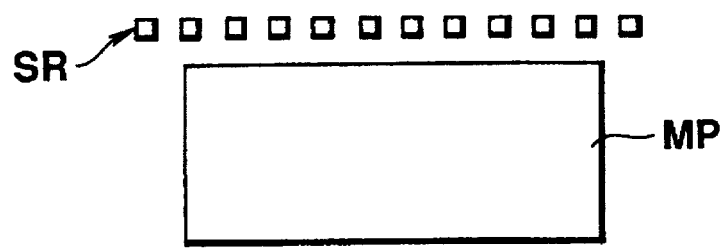
FIG. 15 is a schematic view of an encoded image with one synchronous mark array.
Figure 16:
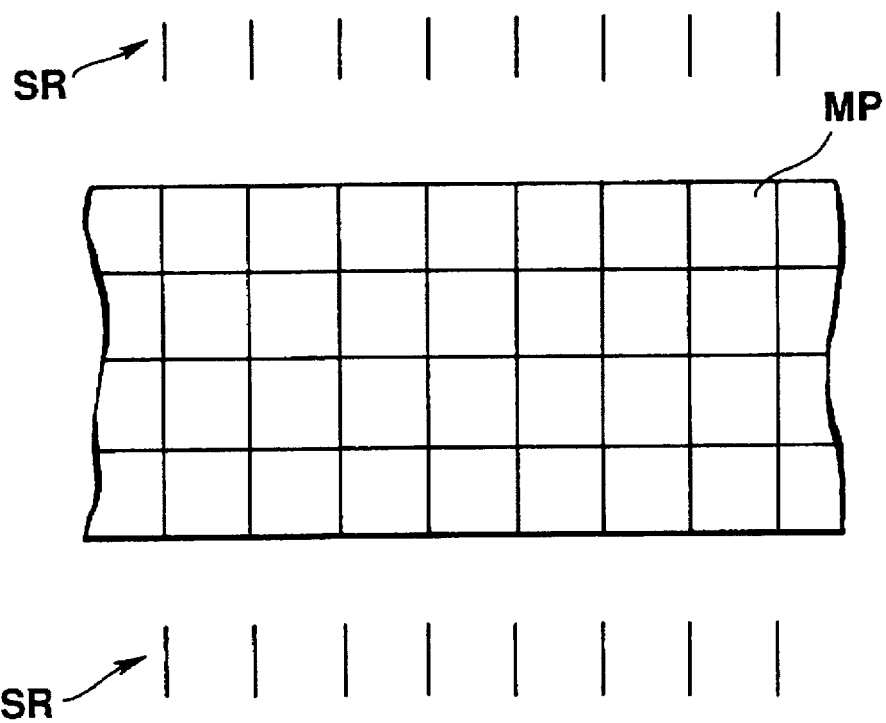
FIG. 16 is a schematic view of an encoded image with synchronous mark arrays in which elongated black marks are arrayed as clocks.
Figure 17:
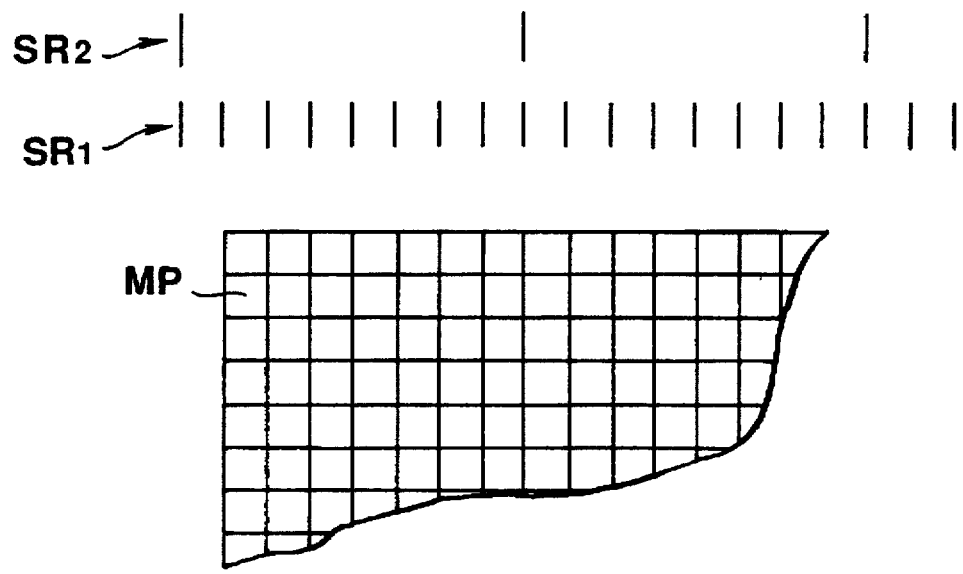
FIG. 17 is a schematic view of an encoded image with synchronous mark arrays having different cycles.

In the encoded image 20 or 120 of the above embodiments, the two synchronous mark arrays 25 in which black and white meshes (clocks) alternately appear on the two sides of the mesh pattern 22 are used as the sub-scanning reference patterns. However, various other appropriate patterns synchronous with sub-scanning mesh arrays (which can have a positional correspondence) may be used as sub-scanning references. For example, when the scanning direction of the image sensor is stable, one synchronous mark array SR extending along the sub-scanning direction of the mesh pattern MP can be sufficiently used, as shown in FIG. 15. In order to restore partially destroyed clocks with higher precision, three or more synchronous mark arrays may be arranged to be separated at given intervals in the main scanning direction. The length of each clock in a synchronous mark can be arbitrarily determined. For example, the sub-scanning reference patterns may be formed, as shown in FIG. 16. That is, synchronous marks SR in each of which clocks forming an elongated black piece are aligned may be arranged above and below the mesh pattern MP to have the relationship that a line connecting corresponding clocks passes through a boundary between adjacent meshes of the mesh pattern MP. Alternatively, as shown in FIG. 17, in addition to a first clock mark array SR1, a second clock mark array SR2 in which each clock mark is arranged every predetermined number (8, in this case) of clock marks of the first clock mark array SR1 may be provided. With these clock arrays, a sub-scanning reference for the mesh pattern MP may be formed. In this case, the number of clocks can be easily managed in an image decoding operation, and partially omitted clock marks can be more reliably restored. For example, a clock mark counter for the first clock mark array SR1 is initialized at a position where a coincidence between clocks of the first and second clock mark arrays SR1 and SR2 is found on the read image data. Thereafter, every time a clock mark on the first clock mark array SR1 is detected or is determined by restoration according to this embodiment, the clock mark counter is incremented. When a coincidence between clocks of the first and second clock mark arrays SR1 and SR2 is detected again, the clock mark counter is checked. In the format shown in FIG. 17, if the content of the counter is equal to 8$n$ ($n$ is a natural number), it can be determined that the first clock mark array is appropriately recognized. If $n$ is 2 or more, it can be evaluated that the second clock mark array SR2 is partially omitted. If the content of the counter is not equal to 8$n$, it can be determined that the first clock marks are erroneously recognized, and an error can be detected. As a result, when the first clock mark array SR1 is partially destroyed and clocks are restored through prediction of the next clock position, actual measurement, comparison, and reevaluation processing operations (see FIGS. 5A and 5B) described in the above embodiments, an error occurring in the restoration process can be restricted to a narrow local area as a clock interval of the second clock mark array SR2. Furthermore, clock positions of the restricted portion can be obtained by equally dividing an interval between the two clocks of the second clock mark array SR2. Therefore, black and white levels of meshes of the entire mesh pattern MP can be identified while recognizing such a local error (in the above embodiment, an error is detected in the whole system as shown in steps 5-17 to 5-19 in FIG. 5B, and decoding is disabled). In a practical application, a sufficient correction opportunity can be given to black-and-white identification data at a position where the above-mentioned local error is found in error correction processing using these checking codes.

The above embodiments are made under an assumption that images such as characters which are not suitable for decoding are present around an encoded image of course, such an assumption need not be made. In this case, recognition of sampling reference patterns can be considerably facilitated, and conditions of reference patterns (conditions of arrangements, geometrical shapes, and the like) for distinguishing reference patterns from images such as characters can be rendered less strict.

In the above embodiments, the main scanning sampling reference patterns (guide lines 21) and the sub-scanning sampling reference patterns (synchronous mark arrays 25) are realized by separate constituting elements on an image. However, a sampling reference pattern which can be commonly used as these patterns may be used.

Referring back to FIG. 16, for example, the synchronous mark array SR may be used as a common main scanning/sub-scanning reference mark. In FIG. 16, the synchronous mark array SR is present outside the mesh pattern MP as a data body. Therefore, if there is no unnecessary image excluding the mesh pattern MP and the synchronous mark array SR, it is not difficult to detect the synchronous mark array SR from the read image data. For example, paying attention to each main scanning line image of the read image data, black pixels appearing at two ends of each main scanning line image suggest a possibility of the presence of pieces of the synchronous mark array SR. In manual scanning, each main scanning line image is normally read not in a perfectly vertical direction but in a slightly inclined direction with some variations. Therefore, if several (two or three) main scanning line images having black pixel groups near their two end portions, successively appear, they indicate a high possibility of the clock marks of the synchronous mark array SR. Of these black pixel groups, black pixels groups which are distributed on image data to have a certain period can be surely determined as clock marks. Thus, paying attention to black pixel groups for several lines, if their centers are actually measured, the measured centers can be determined as those of clock marks. A destroyed clock mark can be detected as follows as in the corresponding processing in FIGS. 5A and 5B. That is, the position of the destroyed clock mark is predicted from an immediately preceding clock mark and its interval or pitch (a distance between the centers of the immediately preceding clock mark and a clock mark preceding the immediately preceding clock mark), and is actually measured using the predicted position as the center. The predicted value is compared with the actual measurement value to detect if a difference therebetween is large. If the difference is large, the predicted point is determined as the center of the current clock mark, or a position determined according to the center of the center of the current clock mark in another array on the basis of an inclination between preceding clock marks is determined as the center of the current clock mark. When the central position of each clock mark is determined in this manner, corresponding clock marks are selected from the upper and lower synchronous mark arrays SR, and their centers are connected by a straight line. The straight line is equally divided according to the number of image meshes, and image bits present at equally divided positions are read to identify black and white levels at the centers of meshes (the last description assumes a case wherein each clock of the synchronous mark array SR in FIG. 16 is shifted by half a mesh in the horizontal direction to coincide with the center of each mesh of the mesh pattern MP).

Figure 18:
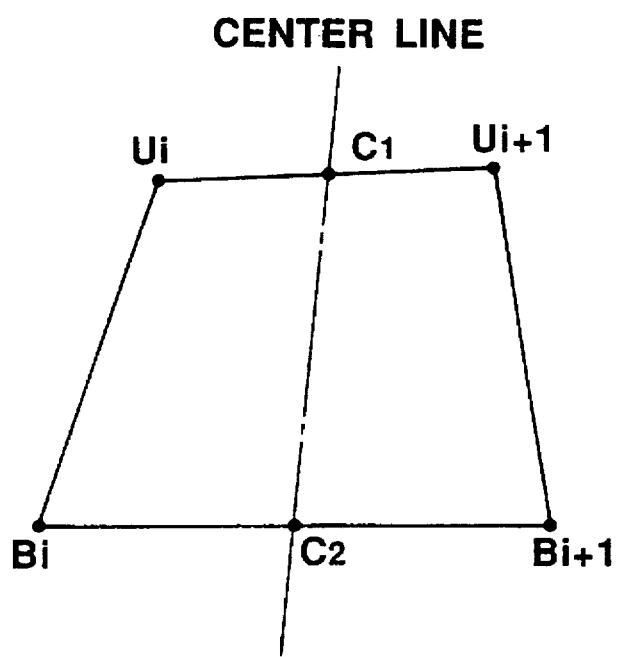
FIG. 18 is a view for explaining processing for identifying black and white meshes by a middle point method from the center of four clocks of the synchronous mark arrays.
Figure 19:
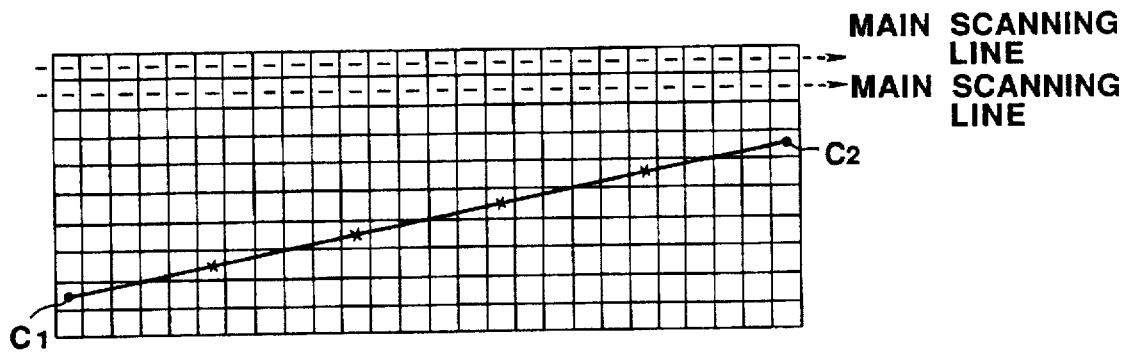
FIG. 19 shows an arrangement of image data on an image RAM including middle points C1 and C2 shown in FIG. 18.

As shown in FIG. 16, when the longitudinal direction of each clock coincides with the boundary between adjacent meshes of the mesh pattern MP, centers $U_i$, $U_{i+1}$, $B_i$, and $B_{i+1}$ of ith and (i+1)th clock marks are selected from the upper and lower synchronous mark arrays SR, and each central position of a target vertical mesh array can be calculated from these position data. This will be described below with reference to FIGS. 18 and 19. In FIG. 18, the centers $U_i$ and $U_{i+1}$ (positions on the read image data) of the ith and (i+1)th clock marks in the upper synchronous mark array SR are connected, and their middle point C1 is calculated. Similarly, the centers $B_i$ and $B_{i+1}$ of the ith and (i+1)th clock marks in the lower synchronous mark array SR are connected to calculate their middle point C2. FIG. 19 shows a portion including the middle points C1 and C2 of the read image data. Each horizontal line in FIG. 19 corresponds to one main scanning line image. One cell in FIG. 19 indicates a 1-bit (1-pixel) memory cell. The middle points C1 and C2 are connected by a straight line, and the line is equally divided according to an image format, thereby determining the central position of meshes in a target mesh array on the image data memory, i.e., a storage position (indicated by a mark "x" in FIG. 19). With the above-mentioned middle point method, since a data sampling point is obtained from two pairs of two adjacent clock centers, errors included in positions $U_i$, $U_{i+1}$, $B_i$, and $B_{i+1}$ as synchronous mark array SR measurement points (or interpolation points) can be absorbed and decreased by averaging.

Points indicated by the marks "x" in FIG. 19 need only be data-sampled to identify black and white levels of meshes. Surrounding pixel values (e.g., upper, lower, right, and left pixel values) of the point indicated by the mark "x" are checked, and black and white levels of meshes may be determined based on the checking results, if so desired. Alternatively, when surrounding pixel values contradict with the pixel value of the point indicated by the mark "x" obtained based on the recognition result of the synchronous mark array SR, data indicating this is stored, and can be effectively used in the error correction processing later using the checking codes, thus enhancing error correction capability. For example, when an error is detected when black-and-white identification data of a certain block is checked according to a checking word, if the block includes a position where a contradiction is found, this position is predicted as a position where the error occurs, thus allowing so-called erasure correction (error correction when an error position is known).

If a sampling reference pattern and a mesh pattern as a data body has a definable positional relationship, the central position of each mesh on the mesh pattern on the image data can be obtained from the defined positional relationship and position data of the sampling reference pattern obtained on the image data. This will be described below with reference to FIGS. 20 to 22. In this case, a description will be made under an assumption that a scanning speed and a scanning direction of the image sensor with respect to an encoded image include certain variations. For the sake of simplicity, two synchronous mark arrays including clock marks and separated at a given interval are used as sampling reference patterns. A mesh pattern is arranged to be sandwiched between these two synchronous mark arrays.

Figure 20:
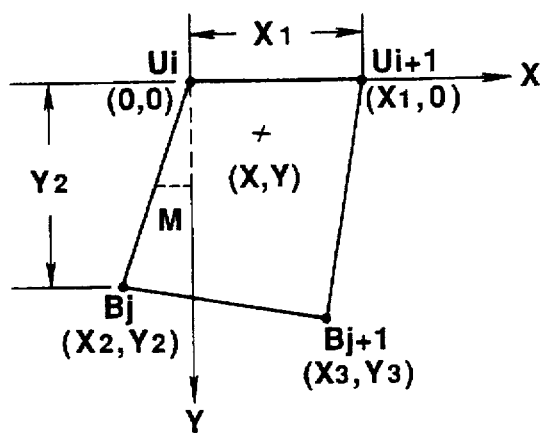
FIG. 20 shows the relationship between four positions of a sampling reference pattern and a mesh position located inside a rectangle defined by the four positions on read image data.

FIG. 20 shows the positional relationship on image data read from the image sensor. Reference symbols $U_i$ and $U_{i+1}$ denote the central positions of ith and (i+1)th clocks of the upper synchronous mark array; and $B_j$ and $B_{j+1}$, the central positions of jth and (j+1)th clocks of the lower synchronous mark array. For example, the central positions $U_i$ and $B_j$, and $U_{i+1}$ and $B_{j+1}$ can be those of adjacent clocks which have a minimum sub-scanning distance on the read image data. In FIG. 20, the coordinates of the point $U_i$ are represented by an origin (0,0), and the coordinates of the point $U_{i+1}$ are represented by a point (x1,0) on the X-axis. The positions on the image memory are merely normalized and expressed for the sake of simplicity. The Y-axis direction corresponds to a direction of a main scanning line image.

Figure 21:
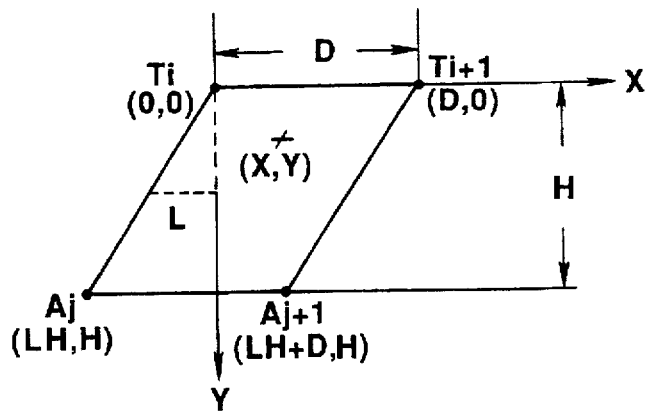
FIG. 21 shows the relationship between four positions of a sampling reference pattern and a mesh position located inside a rectangle defined by the four positions on a recording medium in correspondence with FIG. 20.

FIG. 21 shows the positional relationship on a recording medium in correspondence with FIG. 20. Reference symbols $T_i$ and $T_{i+1}$ denote the centers of ith and (i+1)th clocks in the upper synchronous mark array; $A_j$ and $A_{j+1}$, the centers of jth and (j+1)th clock marks in the lower synchronous mark array. The clock centers $\{T_i\}$ and $\{A_j\}$ of the synchronous mark arrays on the recording medium, and a central position $\{P\}$ of each mesh of the reference pattern are already known items for the data reading apparatus, and the apparatus has these data as an encoded image model. For example, data of all these positions may be stored, or when intervals between positions have a predetermined synchronous relationship, all the central positions can be calculated from one or a plurality of position data and synchronous data. In FIG. 21, a line connecting the centers $T_i$ and $T_{i+1}$ on the upper synchronous mark array and a line connecting the centers $A_j$ and $A_{j+1}$ on the lower synchronous mark array are illustrated to be parallel to each other, but need not always be parallel to each other. In FIG. 21, the center of the ith clock of the upper synchronous mark array is represented by the origin (0,0), and the center of the (i+1)th clock is represented by a point (D,0) on the X-axis.

Assume that clock centers of the synchronous mark arrays as the reference patterns are obtained from the read image data by the method as described above, and a rectangular image block surrounded by the four clock centers $U_i$, $U_{i+1}$, $B_j$, and $B_{j+1}$ (FIG. 20) is considered. The problem is how to detect the central positions of meshes present in this rectangular image block. Thus, the data reading apparatus selects corresponding clock Centers $T_i$, $T_{i+1}$, $A_j$, and $A_{j+1}$ on the encoded image model (i.e., on the recording medium). Since the encoded image model includes position data $\{P\}$ of the centers of meshes in the entire encoded image, a set of central positions of meshes present in a rectangle (in this case, a parallelogram) defined by $T_i$, $T_{i+1}$, $A_j$, and $A_{j+1}$ can be formed. For example, in the case of FIG. 21, a set of coordinates (x,y) which satisfy the following relation can be selected from a set {P} of central positions of all the meshes:

$$0 \leq x+Ly \leq D$$

(L is the inclination)

Internal points of the rectangle defined by $T_i$, $T_{i+1}$, $A_j$, and $A_{j+1}$ correspond to those in a rectangle defined by $U_i$, $U_{i+1}$, $B_j$, and $B_{j+1}$ on the read image data, and never fall outside it. When the central positions of meshes present inside the rectangle are detected on the x-y coordinate system of the encoded image model in this manner, the detected positions are coordinate-converted to positions on the X-Y coordinate system of the read image data, and image bits at the converted position can be extracted.

FIG. 22(a)–22(f) show examples of coordinate conversion. FIG. 22(a) shows an image block of interest on the model, and the center of a certain mesh is represented by coordinates (x,y). FIG. 22(f) shows a corresponding image block (target image block) on the read image data, and coordinates corresponding to the coordinates (x,y) are represented by (X,Y). An operation executed between FIGS. 22(a) and 22(b) is horizontal scaling for matching the length of the upper side of a rectangle, an operation executed between FIGS. 22(b) and 22(c) is conversion for matching the inclination with that of the lower side (from $U_i$ to $B_j$) of the target image block, and an operation between FIGS. 22(c) and 22(d) is scaling for matching the length of the left side with that of the left side of the target image block. With these operations, of the four apexes $U_i$, $U_{i+1}$, $B_j$, and $B_{j+1}$ of the target image block, three points $U_i$, $U_{i+1}$, and $B_j$ coincide with corresponding points of the image block of interest. As shown in FIG. 22(e), a corresponding point of the image block shown in FIG. 22(d) need only be shifted to the point $B_{j+1}$ diagonal to the point $U_i$, thus obtaining the target image block. An image block is a local area, and changes in speed or direction in the local area are very small even in manual scanning. Therefore, conversion from FIG. 22(d) to FIG. 22(e) can be considered as a uniform distortion (distortion proportional to an area ratio) without posing any problem.

As a result, the target coordinates (X,Y) are given by:

$$X = Xd + \Delta D \cdot \left( \frac{Xd + M \cdot Yd}{X1} \right) \cdot \left( \frac{Yd}{Y2} \right) \quad (1)$$

$$Y = Yd + \Delta H \cdot \left( \frac{Xd + M \cdot Yd}{X1} \right) \cdot \left( \frac{Yd}{Y2} \right) \quad (2)$$

for $$\Delta D = (X3 - X2)X1 \quad (3)$$
$$\Delta H = Y3 - Y2 \quad (4)$$

$$Xd = \left( \frac{X1}{D} \right) x + (M-L) y \quad (5)$$

$$Yd = \left( \frac{Y2}{H} \right) y \quad (6)$$

Multiplicators for $\Delta D$ and $\Delta H$, given by the above equations (1) and (2) represent an area ratio of a rectangle in FIG. 22(d) indicated by a solid line, and a rectangle indicated by a dashed line and having coordinates (Xd,Yd) as a diagonal point. $\Delta D$ is the difference between the lengths of the upper and lower sides of the target image block, and $\Delta H$ is the difference between the lengths along the Y-axis of the right and left sides of the target image block (see FIG. 20 for further details about X1, X2, X3, Y1, and Y2). In this manner, the central coordinates (X,Y) of a corresponding mesh in the target image block can be obtained from the coordinates (x,y) of a mesh center in the model. Therefore, an image bit present at the position (X,Y) is sampled to obtain data indicating a black or white level of the mesh. Note that since an image frame formed by the points $T_i$, $T_{i+1}$, $A_j$, and $A_{j+1}$ is actually an elongated small local area (see FIG. 2), an offset $\Delta H$ is normally considered to have a negligible magnitude ($\Delta H=0$) even when manual scanning is performed. Therefore, equation (2) can be simplified as Y=Yd.

As described above, according to one arrangement of the present invention, image data obtained by reading an encoded image on a recording medium is segmented into a plurality of partial image data blocks, and a feature pixel group featuring a piece of a main scanning reference pattern is searched using the segmented partial image data blocks as searching units. A position of the reference scanning pattern in a partial image data block for which searching is unsuccessful is determined based on position data of normal pieces, indicated by the feature pixel groups for which searching is successful, of the main scanning reference pattern. Therefore, even when the main scanning reference pattern is partially destroyed by, e.g., contamination on the recording medium, its position can be obtained with high precision, and black and white levels of meshes of the mesh pattern can be reliably identified on the basis of the position data of the main scanning reference pattern.

Furthermore, according to one aspect of the present invention, when synchronous marks used for positioning a mesh pattern as elements of a scanning reference pattern are searched from image data obtained by reading an encoded image including the mesh pattern and the scanning reference pattern, a position of a synchronous mark to be determined next is predicted according to feature parameters of a synchronous mark determined by actual measurement, and the synchronous mark is actually measured to have the predicted position as the center. The actual measurement result and the predicted content are compared with each other. When the two results essentially coincide with each other, the actually measured position is determined as the position of the synchronous mark. However, when a non-coincidence is found, a mark destroyed portion caused by, e.g., contamination is detected, and the position of the synchronous mark is determined based on the already determined feature parameters. Therefore, even when the scanning reference pattern is partially destroyed by contamination or stain, the position of the corresponding synchronous mark can be determined with high precision without omission. Thus, black and white levels of meshes of the mesh pattern can be reliably identified based on the determined position data.

Third Embodiment

The third embodiment of the present invention will be described below. <Data Recording Apparatus>

Figure 23:
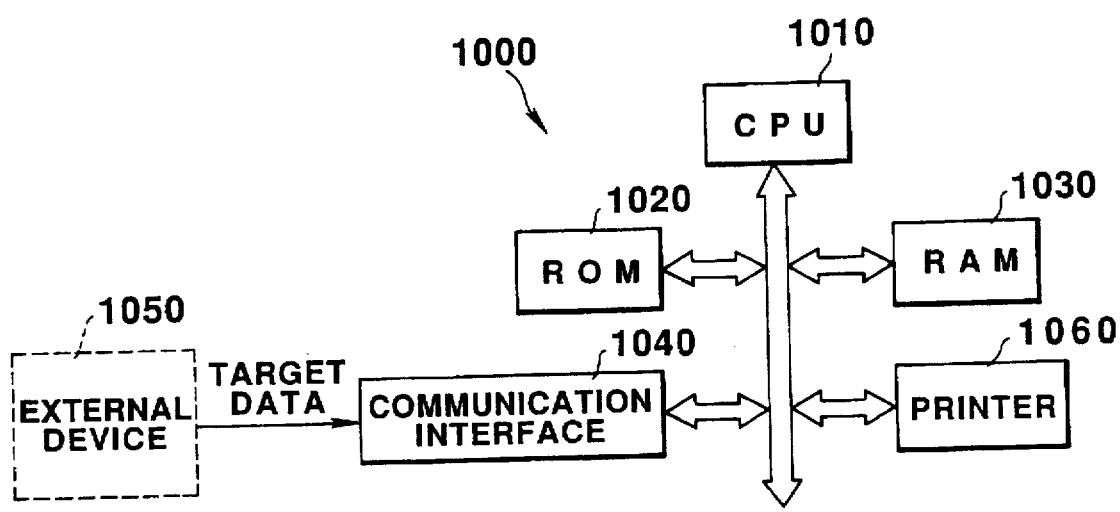
FIG. 23 is a block diagram showing a data recording apparatus according to the third embodiment of the present invention.

FIG. 23 shows the overall arrangement of a data recording apparatus 1000 according to the third embodiment. The object of the entire apparatus is to record an image obtained by encoding data on a recording medium such as paper or a sheet (which image is the same as that shown in FIG. 2 described in the first embodiment, and will be described below with reference to FIG. 2). The characteristic feature of the data recording apparatus will be described in detail later.

In FIG. 23, a CPU 1010 is operated according to a program stored in a ROM 1020. In a data loading mode, the CPU 1010 loads target data (e.g., a user program list) supplied from an appropriate external device 1050 (e.g., a personal computer) in a RAM 1030 through a communication interface 1040. In a recording mode, the CPU 1010 performs various error countermeasures of the target data stored in the RAM 1030 to form a data array which has a one-to-one correspondence with image elements (meshes in this case) of an encoded image. Thereafter, the CPU 1010 controls a printer 1060 to print the encoded image on a recording medium.

The operation of the data recording apparatus 1000, especially error countermeasures, will be described in detail below with reference to FIGS. 24 to 33.

Figure 24:
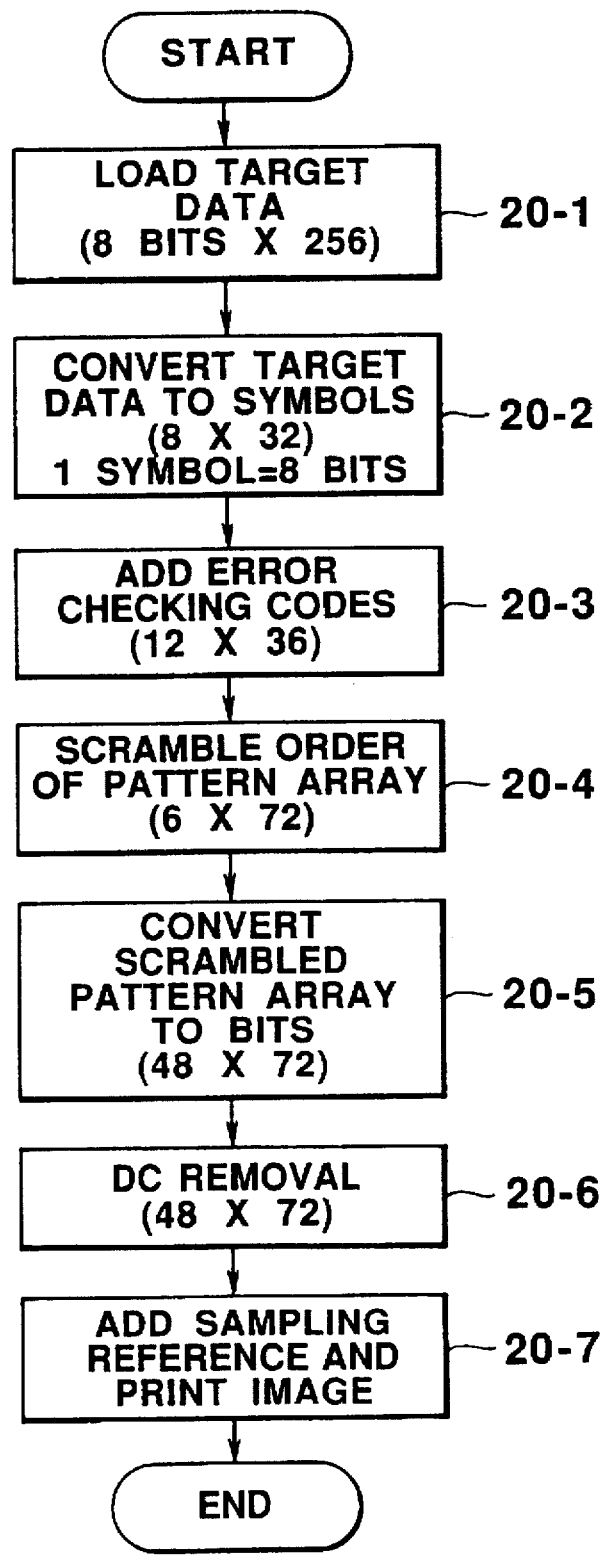
FIG. 24 is a flow chart showing the overall operation of the data recording apparatus shown in FIG. 23.

In step 20-1 in FIG. 24, target data is loaded from the external device 1050 to the RAM 1030 through the communication interface 1040. The bit matrix of this target data is denoted by reference numeral 300 in FIG. 25. When the encoded image 20 shown in FIG. 2 described in the first embodiment is assumed to be used, the format of the mesh pattern 22 as its data body corresponds to a 48×72 two-dimensional mesh matrix. Each mesh is an image element expressing one bit as a minimum unit of data. For example, a black mesh expresses a bit "1", and a white mesh expresses a bit "0". When the 48×72 mesh pattern 22 is used, the size of the target data is given by 8 (bits)×256 (256 bytes), and the data recording apparatus 1000 processes 2,048-bit target data $d_0$ to $d_{2047}$ as the 64 (bits)×32 (bits) two-dimensional bit matrix 300, as shown in FIG. 25.

In step 20-2 (FIG. 24), 8 bits in the bit matrix 300 are considered as 1 symbol, and target data $s_0$ to $s_{255}$ consisting of 256 symbols are considered as an 8×32 two-dimensional symbol matrix 400 shown in FIG. 26. The size of each symbol is significant as a data unit (word) in steps 20-3 and 20-4 (to be described later). Note that the present invention is not limited to 1 symbol=8 bits in step 20-2.

The following relationship is established between the two-dimensional symbol matrix 400 and the two-dimensional bit matrix 300:

$$S_n = d_{8n+7} + 2d_{8n+6} + 2^2 d_{8n+5} + 2^3 d_{8n+4} + 2^4 d_{8n+3} + 2^5 d_{8n+2} + 2^6 d_{8n+1} + 2^7 d_{8n}$$

In step 20-3 (FIG. 24), error checking codes are added to the two-dimensional symbol matrix 400 of the target data to form a symbol matrix 500 with error checking codes shown in FIG. 27. Arbitrary codes may be used as error checking codes. In FIG. 27, four checking symbols p are added to each flow (line) of the symbol matrix 400 of the target data, and four checking symbols q are added to each of 12 columns of a two-dimensional matrix formed by the symbols p. In this case, since four error checking symbols (block checking codes) are added per block (one flow or column), the four checking codes themselves have a double symbol error correction function. Furthermore, since two systems of checking codes p (flows) and q (columns) are added to the symbols s, quadruple erasure correction in each block of the target data can be realized. In the matrix shown in FIG. 27, checking symbols p and q are added assuming so-called Reed-Solomon codes. Its relation is as follows:

$$\begin{bmatrix} \alpha^0 & \alpha^0 & \cdots & \alpha^0 & \alpha^0 & \alpha^0 \\ \alpha^{11} & \alpha^{10} & \cdots & \alpha^2 & \alpha^1 & \alpha^0 \\ \alpha^{22} & \alpha^{20} & \cdots & \alpha^4 & \alpha^2 & \alpha^0 \\ \alpha^{33} & \alpha^{30} & \cdots & \alpha^6 & \alpha^3 & \alpha^0 \end{bmatrix} \begin{bmatrix} s_0 \\ s_1 \\ s_2 \\ s_3 \\ s_4 \\ s_5 \\ s_6 \\ s_7 \\ q_0 \\ q_1 \\ q_2 \\ q_3 \end{bmatrix} = \begin{bmatrix} 0 \\ 0 \\ 0 \\ 0 \end{bmatrix} \quad (7)$$

and, $$\begin{bmatrix} \alpha^0 & \alpha^0 & \cdots & \alpha^0 & \alpha^0 & \alpha^0 \\ \alpha^{35} & \alpha^{34} & \cdots & \alpha^2 & \alpha^1 & \alpha^0 \\ \alpha^{70} & \alpha^{68} & \cdots & \alpha^4 & \alpha^2 & \alpha^0 \\ \alpha^{105} & \alpha^{102} & \cdots & \alpha^6 & \alpha^3 & \alpha^0 \end{bmatrix} \begin{bmatrix} s_0 \\ s_8 \\ s_{16} \\ s_{24} \\ s_{32} \\ s_{40} \\ \cdot \\ \cdot \\ p_0 \\ p_1 \\ p_2 \\ p_3 \end{bmatrix} = \begin{bmatrix} 0 \\ 0 \\ 0 \\ 0 \end{bmatrix} \quad (8)$$

where $\alpha$ as a primitive element of a Galois body GF ($2^8$) is one of roots of a polynomial given by:

$$x^8 + x^4 + x^3 + x^2 + 1$$

$\alpha$ takes a value of 2 in decimal notation, and is expressed by a binary number as follows:

00000010(B)

In this connection, $\alpha^8 = \alpha^4 + \alpha^3 + \alpha^2 + 1 = 16 + 8 + 4 + 1 = 29$, and $\alpha^1$ to $\alpha^{225}$ take corresponding proper values from 1 to 255 ($\alpha^{225} = 1$). "0"s of the right-hand sides of equations (7) and (8) indicate that a so-called syndrome is zero.

For example, when equation (7) is solved for q, we have:

$$[Q] = [A_1]^{-1} \cdot [A_2] \cdot [W] \quad (9)$$

for $$[Q] = \begin{bmatrix} q0 \\ q1 \\ q2 \\ q3 \end{bmatrix}$$

$$[A_2] = \begin{bmatrix} \alpha^0 & \alpha^0 & \cdots & \alpha^0 & \alpha^0 & \alpha^0 \\ \alpha^{11} & \alpha^{10} & \cdots & \alpha^5 & \alpha^4 & \alpha^3 \\ \alpha^{22} & \alpha^{20} & \cdots & \alpha^{12} & \alpha^{10} & \alpha^8 \\ \alpha^{33} & \alpha^{30} & \cdots & \alpha^{18} & \alpha^{15} & \alpha^{12} \end{bmatrix}$$

$$[A_1]^{-1} = \begin{bmatrix} \alpha^0 & \alpha^0 & \alpha^0 & \alpha^0 \\ \alpha^3 & \alpha^2 & \alpha^1 & \alpha^0 \\ \alpha^6 & \alpha^4 & \alpha^2 & \alpha^0 \\ \alpha^9 & \alpha^6 & \alpha^3 & \alpha^0 \end{bmatrix}^{-1} = \begin{bmatrix} \alpha^{212} & \alpha^{153} & \alpha^{152} & \alpha^{209} \\ \alpha^{156} & \alpha^2 & \alpha^{135} & \alpha^{152} \\ \alpha^{158} & \alpha^{138} & \alpha^2 & \alpha^{153} \\ \alpha^{218} & \alpha^{158} & \alpha^{156} & \alpha^{212} \end{bmatrix}$$

$$[W] = \begin{bmatrix} s_0 \\ s_1 \\ s_2 \\ s_3 \\ s_4 \\ s_5 \\ s_6 \\ s_7 \end{bmatrix}$$

Equation (8) is similarly solved to calculate p.

As a result of adding the error checking codes p and q, the two-dimensional matrix 500 having a size of 12×36 symbols can be obtained.

The above-mentioned block type error checking codes p and q are mainly used as countermeasures against random errors, and are not effective for burst errors. For example, when a contamination becomes attached to a considerably wide contiguous range on an encoded image, an error beyond correction capability of the error checking codes may occur.

In step 20-4 in FIG. 24, countermeasure processing against burst errors is executed to change the order of elements of the matrix 500 so that a contiguous area on the two-dimensional symbol matrix 500 obtained in step 20-3 (processing for adding error checking codes) is converted into discrete small areas on the encoded image. Processing in step 20-4 will be referred to as scrambling or interleaving hereinafter. FIGS. 28A, 29A, and BOA respectively show symbol matrices 600, 700, and 800 after first, second, and third scrambling operations. Symbol matrices 600S, 700S, and 800S in FIGS. 28B, 29B, and 30B are simplified ones of the structures of the symbol matrices 600, 700, and 800 to allow easy understanding. In the first scrambling operation, line data of the symbol matrix 500 after the error checking codes are added is replaced. That is, ninth and tenth line data of the original matrix are moved to the third and fourth lines of the original matrix 500, respectively; the third to sixth line data of the original matrix 500 are moved downward by two lines; eleventh and twelfth line data of the original matrix 500 are moved to the ninth and tenth lines of the original matrix 500, respectively; and seventh and ninth line data of the original matrix 500 are moved to the eleventh and twelfth lines, respectively, thereby forming a first scrambled matrix 600. Please refer to the matrix 600S in FIG. 28B as a rough structure of the matrix 600 shown in FIG. 28A. In the second scrambling operation after the first scrambling operation, the lower half of the first scrambled matrix 600 is attached to the right-hand side of the upper half, thus forming a 6×72 (symbols) second scrambled matrix 700. Finally, in the third scrambling operation, the second scrambled matrix 700 is moved in the horizontal direction by 16 symbols. As a result, a third scrambled matrix 800 shown in FIG. 30A is obtained.

The last scrambled matrix 800 has the same positional relationship as the two-dimensional mesh matrix on the encoded image, and contiguous elements on the scrambled matrix 800 are similarly contiguous elements on the encoded image. However, the matrix 800 has the relationship with the matrix 500 before scrambling so that a contiguous portion on the matrix 500 is located at discrete positions on the scrambled matrix 800. For example, for $q_{128}$, $q_{129}$, $q_{130}$, and $q_{131}$ in the ninth to twelfth lines of the 33rd column on the matrix 500 before scrambling, $q_{128}$ and $q_{129}$ are located at the third and fourth lines of the 17th column, and $q_{130}$ and $q_{131}$ are located at the third and fourth lines of the 53rd, column on the scrambled matrix 800. As a result, since a burst error on the encoded image is scattered as short errors on the matrix 500 before scrambling, error correction within the capability of the error checking codes p and q can be realized. As schematically shown by the matrix 800S in FIG. 30B, a q portion occupies the central portion of the scrambled matrix 800 (FIG. 30A). This arrangement is made in consideration of a method of adding the error checking codes (FIG. 27) and a mesh data sampling method of a data reproducing apparatus. More specifically, as can be seen from FIG. 27, two systems of error checking codes p and q are associated with target data s, while only codes for checking horizontal blocks (lines) are added to the error checking codes q. For this reason, even if a code error occurs in this portion, there is no means for confirming the position of the error. As long as block checking codes or finite convolution checking codes are used on a finite matrix, this problem is not perfectly avoided. In other words, on the matrix 500 shown in FIG. 27, an error at a symbol $s_0$ reflected on both a syndrome value of the first line and a syndrome value of the first column (symbol values are not equal to zero), while an error at a symbol $q_{128}$ is reflected on only a syndrome value of a column (33rd column) to which $q_{128}$ belongs. For this reason, when errors occur at three positions, e.g., the symbols $q_{128}$, $q_{129}$, and $q_{130}$, correction is impossible. An error in an area of q is serious, and hence, its frequency is preferably decreased to be lower than that in other portions. Meanwhile, in main scanning decoding processing described later in a data reproducing apparatus, image bits at points obtained by equally dividing an interval between the guide lines 21 are sampled using the upper and lower guide lines 21 of the mesh pattern 22 (FIG. 2) as the main scanning reference patterns. In this sampling method, an offset of an equally divided point from a true position is maximized near each guide line 21, and the central portion of the mesh pattern 22 has maximum safety. Therefore, as shown in FIG. 30A, the error checking codes q are arranged at the central portion of the matrix 800, thus decreasing an error rate of these codes q to be lower than those of other codes.

Figures 31, 32:
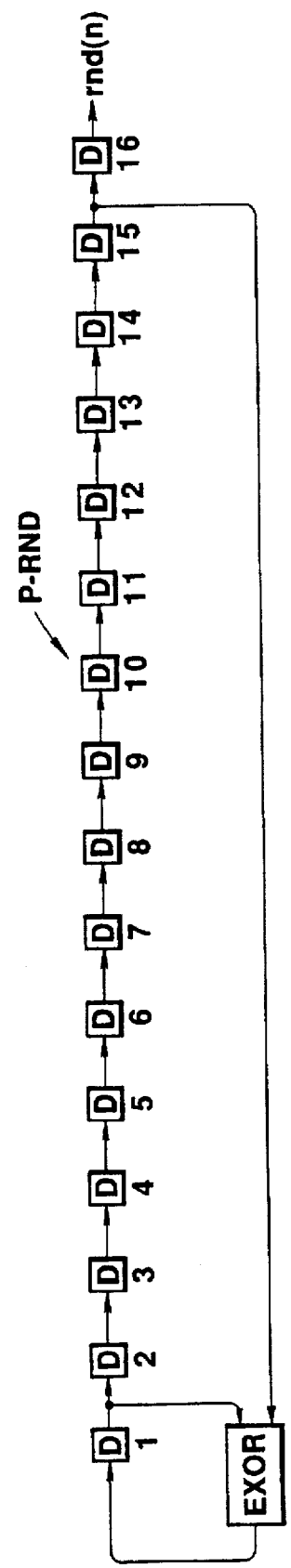
FIG. 31 shows a scrambled bit matrix.
FIG. 32 shows an arrangement of a pseudo random number generator for removing a DC component from a scrambled bit matrix.

The scrambled two-dimensional symbol matrix 800 is converted to a 48×72 (bit) two-dimensional bit matrix 900 while considering each symbol as vertical 8 bits, as shown in FIG. 31 (step 20-5 in FIG. 24). In this case, for example, $s_{128}=[b_0b_1b_2b_3b_4b_5b_6b_7]^T$ (where T is the transposed matrix).

Step 20-6 is executed to prevent an error caused by a variation of conversion characteristics of the image sensor used in a data reproducing apparatus. More specifically, photoelectric conversion characteristics of an image sensor cannot perfectly follow an instantaneous value of incident light. Thus, when an image is scanned using such an image sensor, a conversion output varies between a case wherein scanning enters a white (or black) area after a long black (or white) area, and a case wherein a white (or black) area is kept scanned. For this reason, a white portion isolated in a black area is affected by the surrounding black area, and is detected while being reduced, or may sometimes be detected as a black pixel. As a result, accurate image data cannot often be provided. As shown in FIG. 2, the encoded image of the present invention comprises a two-dimensional blackand-white mesh matrix of the mesh pattern 22, and each black or white mesh expresses one bit. Therefore, it is preferable that pixel values are accurately obtained, and this is necessary when each mesh is small and hence, a recording density is high. Meanwhile, since data often have the same bit value, the above-mentioned detection error of a pixel value tends to occur in such an area. In step 20-6 in FIG. 24, bit values on the scrambled two-dimensional bit matrix 900 are randomized using pseudo random numbers, so that the same bit value does not continue over a long distance, thereby solving the above problem.

FIG. 32 shows an example of randomization. A pseudo random number generator P-RND EXORs an output from a D flip-flop D15 of a 16-bit shift register (constituted by D flip-flops 1 to 16) and an output from a D flip-flop D1, shifts bits of the shift register to the right, and inputs the EXORed result to the D flip-flop D1. A pseudo random number output rnd(n) is extracted from the D flip-flop D16, and is EXORed with a corresponding element bn on the bit matrix 900 ( $\tilde{b}n=bn \oplus rnd(n)$), thereby randomizing the elements of the matrix 900. At the beginning of the operation, an appropriate initial value (e.g., BB8 (hex)) is preferably set in the shift register. As a result, a 48×72 randomized two-dimensional bit matrix 1100 is formed, as shown in FIG. 33.

The randomized two-dimensional bit matrix 1100 has a one-bit to one-mesh correspondence with the two-dimensional mesh matrix of the mesh pattern 22 to be recorded on the recording medium while positions on the matrices coincide with each other, and black and white levels of the meshes are specified by bit values.

In order to achieve this, in step 20-7, the mesh pattern 22 according to the bit matrix 1100 is printed on the recording medium. In step 20-7, sampling reference marks having a predetermined positional relationship with the mesh pattern 22 are also printed. The sampling reference marks adopt the guide lines 21, the synchronous mark arrays 22, and the data start and end marks 23 and 24 shown in FIG. 2. As will be described later, a data reproducing apparatus finds these sampling reference marks from read data of the encoded image 20, determines mesh positions in the mesh pattern 22 with reference to positions of these reference marks, and samples image bits there. <Data Reproducing Apparatus>

A method and apparatus for reading the encoded image 20 (FIG. 2) recorded on a recording medium described above have already been described in association with the first embodiment, and a repetitive description will be avoided.

Figure 34:
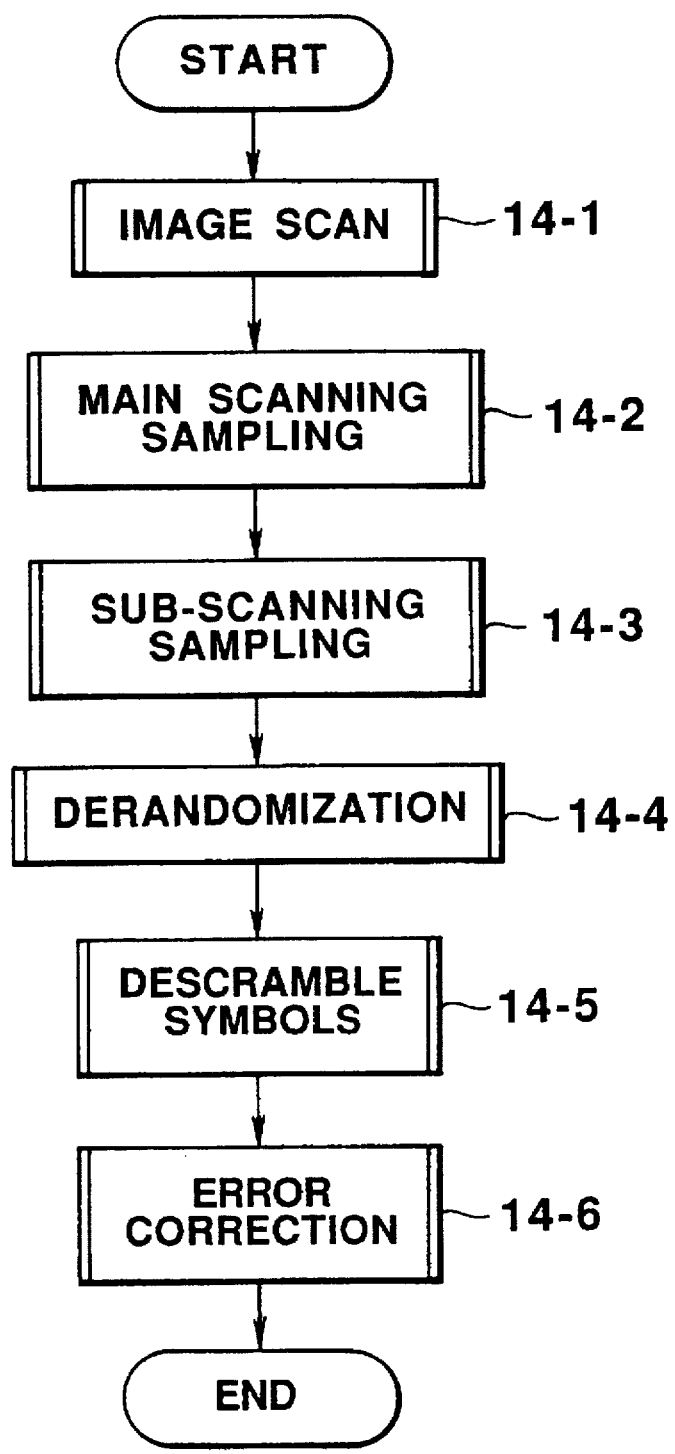
FIG. 34 is a flow chart showing the overall operation of a data reproduction apparatus.

This embodiment will be described below with reference to the circuit arrangement shown in FIG. 1 A CPU 13 operates according to a program stored in a ROM 14 (see FIG. 34). While an image sensor 11 scans an image, every time a controller 12 converts serial image data into parallel data, the CPU 13 writes the parallel data in an image RAM 15 (14-1). Upon completion of image scanning, the CPU 13 starts a decoding operation (14-2 to 14-6) of image data stored in the image RAM 15, and stores the decoded result in a RAM 16.

The decoding operation for reproducing data is basically achieved by following encoding processing executed by the data recording apparatus 1000 in an opposite direction. First, main scanning sampling step 14-2 (FIG. 34) and sub-scanning sampling step 14-3 are executed to sample image bits representing black and white levels of meshes located at the central positions of meshes from read image data, thereby obtaining a matrix corresponding to the last two-dimensional bit matrix 1100 described in data recording. Processing operations in steps 14-1 to 14-3 are the same as those described in association with the first embodiment. In DC (derandomization) step 14-4, the elements on the matrix are derandomized using the pseudo random numbers described with reference to FIG. 32, thereby forming a matrix corresponding to the non-randomized bit matrix 900 shown in FIG. 31. The reason why the non-randomized bit matrix 900 is restored is that the randomization is given by:

$$\tilde{b}_n = b_n \oplus rnd(n)$$

derandomization is given by:

$$b_n = \tilde{b}_n \oplus rnd(n)$$

and, the two equations are derived for the same pseudo random number rnd (n). The DC processing itself is the Same as randomization processing step 20-6, except that data to be EXORed with rnd (n) is $b_n$ (non-randomized data) or $\tilde{b}_n$ (randomized data), and a further description thereof will be omitted.

After the non-randomized symbol matrix is obtained, processing (descrambling) Opposite to scrambling processing step 20-4 described with reference to FIGS. 28A and 28B, FIGS. 29A and 29B, and FIGS. 30A and 30B is executed to descramble the symbols, thereby obtaining a matrix corresponding to the symbol matrix 500 with the error checking codes before scrambling (14-5). This descrambling processing step 14-5 can also be understood from the description about the scrambling processing, and a detailed description thereof will be omitted.

A difference between the descrambled symbol matrix with the error checking codes and the symbol matrix with the error checking codes which is formed in encoding is an error. Thus, in step 14-6, error correction is executed using the error checking codes, thus obtaining target data.

Of the series of these processing operations, a matrix, in which black and white levels of meshes are indicated by bits, corresponding to the last two-dimensional bit matrix 1100 is obtained as a result of sampling based on the scanning reference patterns. Under a user environment wherein a scanning speed and a scanning direction can be kept constant using a mechanical scanning type image sensor, even if no scanning reference patterns are arranged, meshes can be directly recognized from image data which is free from image distortion, as has been described in the second embodiment.

Figure 35:
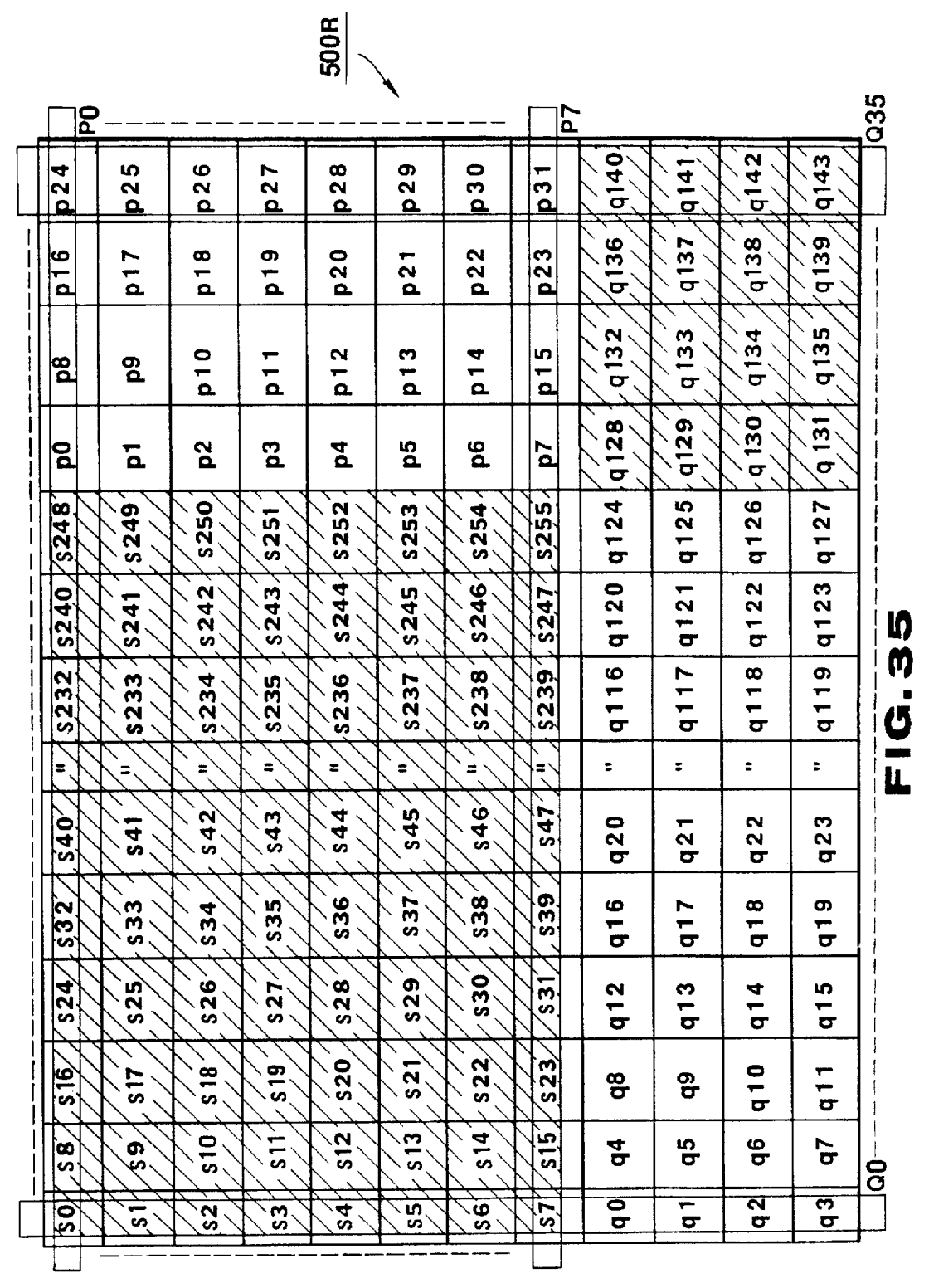
Figure 36:
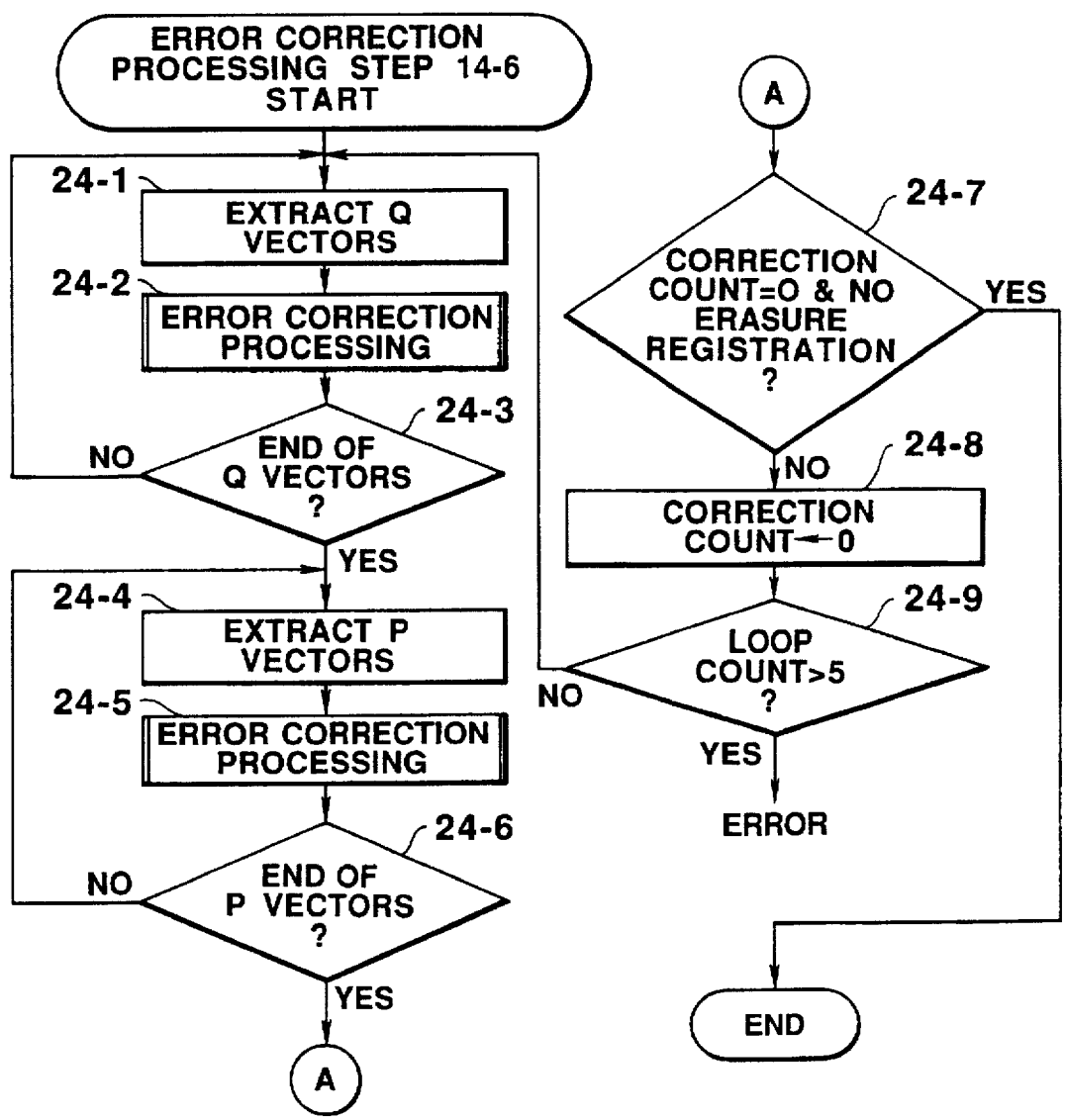
FIG. 36 is an overall flow chart of error correction processing.

The error correction step 14-6 as the characteristic feature of this embodiment will be described in detail below. FIG. 36 shows the entire error correction flow. Before this flow starts, a descrambled two-dimensional symbol matrix 500R with error checking codes is obtained, as shown in FIG. 35. P0 to P7 in FIG. 35 respectively indicate first to eighth lines of the two-dimensional matrix 500R. Since error checking codes p are added to these lines, these lines are called P vectors in FIG. 36. Since error checking codes q are added to columns (indicated by Q0 to Q35), of the two-dimensional matrix, these columns are called Q vectors in FIG. 36. In the loop including steps 24-1 to 24-3 in FIG. 36, error correction processing step 24-2 is executed once for the 36 Q vectors. Thereafter, in the loop including steps 24-4 to 24-6, error correction processing step 24-5 is executed once for the eight P vectors. Thereafter, the flow advances to step 24-7 to check if correction is actually executed in steps 24-2 and 24-5 or erasure registration necessary for subsequent correction is performed although no correction is executed. Since it can be considered that an error remains excluding a case wherein neither of these operations are performed, a correction count is reset to zero, and steps 24-1 to 24-5 are executed under a condition that the number of loop times is small (5 or less in FIG. 36). When the number of loop times is large, considerable errors are included in the matrix 500R, and even if error correction is continued, error correction must be further repeated. Thus, the processing is stopped in this case.

Figure 37:
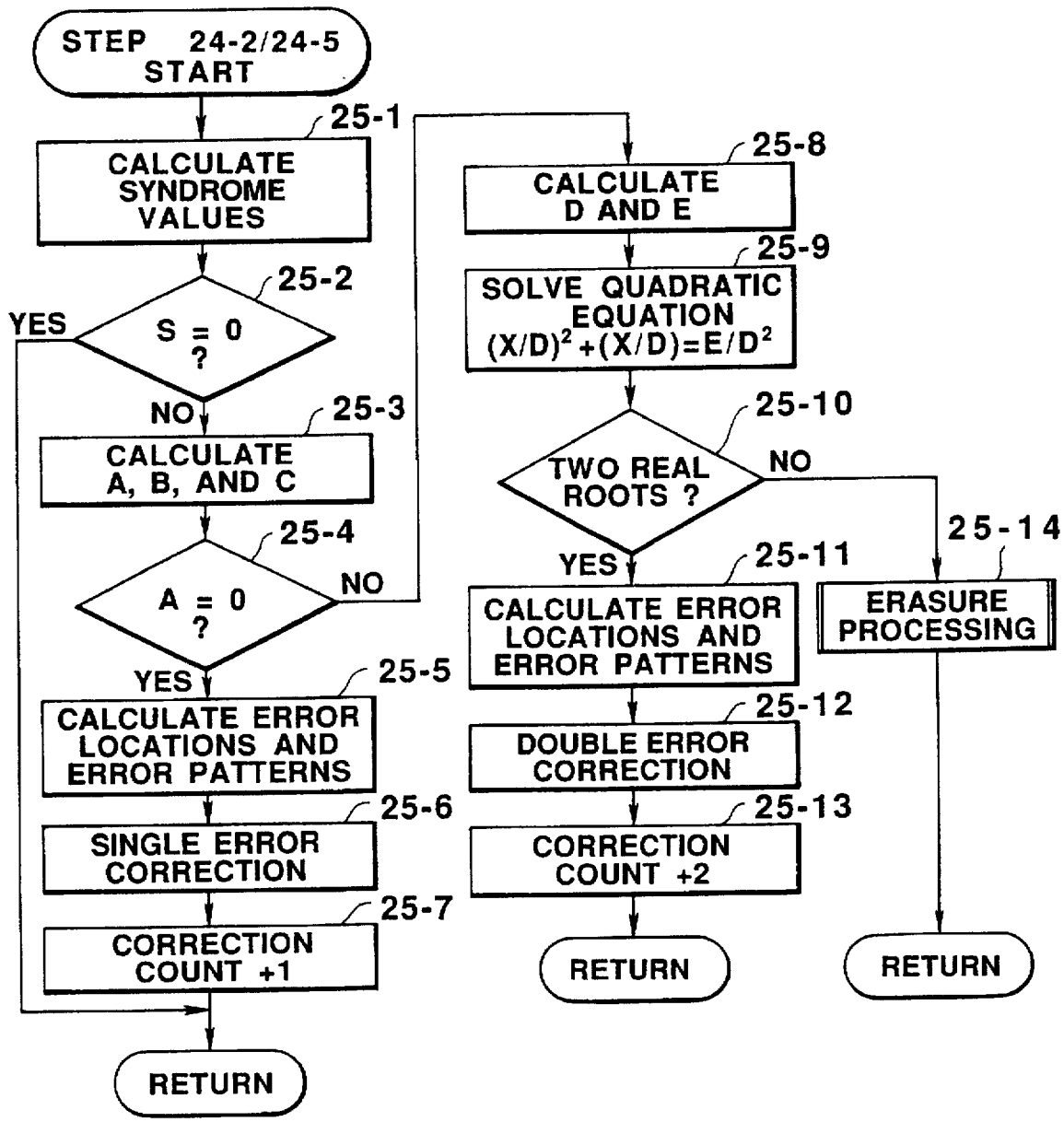
FIG. 37 is a detailed flow chart of steps 24-2 and 24-5 of the processing shown in FIG. 36.

FIG. 37 shows error correction processing steps 24-2 and 24-5 in detail. In step 25-1, calculations corresponding to the left-hand side of equation (7) are executed for the Q vectors, and calculations corresponding to the left-hand side of equation (8) are executed for the P vectors, thereby obtaining syndrome values. That is, a syndrome matrix is multiplied with a vector of interest. If there is no error in the vector (block) of interest, syndrome values ($S_0$, $S_1$, $S_2$, $S_3$) become zero, as shown in equations (7) and (8). Thus, the syndrome values are checked in step 25-2. If all the syndrome values are zero, the flow returns to the main routine since no error is detected. Thus, an operation of checking a no-error state which has the highest possibility is completed. An error having the second highest possibility is a single-symbol error, and an error having the third highest possibility is double-symbol errors. Since four error checking codes are added per vector, correction can be made up to the double errors. When the syndrome values become non-zero, an error of one or two symbols is assumed. If two symbols in one vector include errors, location values representing error positions are represented by $X_1$ and $X_2$, and error patterns are presented by $Y_1$ and $Y_2$, the following relations are established for the syndrome values $S_0$, $S_1$, $S_2$, and $S_3$ which have already been calculated in step 25-1:

$$S_0 = Y_1 + Y_2$$

$$S_1 = X_1 Y_1 + X_2 Y_2$$

$$S_2 = X_1^2 Y_1 + X_2^2 Y_2$$

$$S_3 = X_1^3 Y_1 + X_2^3 Y_2$$

Thus, four simultaneous equations for four unknowns $X_1$, $X_2$, $Y_1$, and $Y_2$ are obtained. The location values $X_1$ and $X_2$ become a root of $AX^2 + BX + C = 0$ for:

$$A = S_0 \cdot S_2 + S_1^2$$

$$B = S_1 \cdot S_2 + S_0 \cdot S_3$$

$$C = S_1 \cdot S_3 + S_2^2$$

In step 25-3, values of A, B, and C are calculated. In consideration of a possibility of a single-symbol error, since $Y_1$ or $Y_2$ is zero, A=0 is established. Thus, it is checked in step 25-4 if A=0. If A=0, a single-symbol error is determined, and its error pattern (Y=$S_0$) and a location value (X=$S_1/S_0$) are obtained. The error pattern is added (EXORed) to a symbol specified by the location value, thus correcting the single-symbol error. Thereafter, a correction count is incremented by one (25-5 to 25-7).

If A=0 is not established, D (=B/A) and E (=C/A) are calculated (25-8), and the following quadratic expression is solved (25-9):

$$(X/D)^2 + (X/D) = E/D^2 \qquad (10)$$

If double-symbol errors occur, two real roots are obtained. If the two real roots are obtained in step 25-10, double-symbol errors are determined, and error location values $X_1$ and $X_2$ ($X_1$ is D times of a solution R of equation (10), i.e., DR, and $X_2$ is given by $X_2 = D + X_1$), and error patterns $Y_1$ and $Y_2$ ($Y_2 = (X_1 \cdot S_0 + S_1)/(X_1 + X_2)$, $Y_1 = S_0 + Y_2$) are calculated. The error patterns are respectively added to the two symbols indicated by the two error location values to correct these symbols, and the correction count is incremented by two (25-11 to 25-13). If NO is determined in step 25-10, since three or more errors occur and cannot be corrected by this correction alone, the flow advances to erasure processing step 25-14 utilizing results of vectors in other systems.

Figure 38:
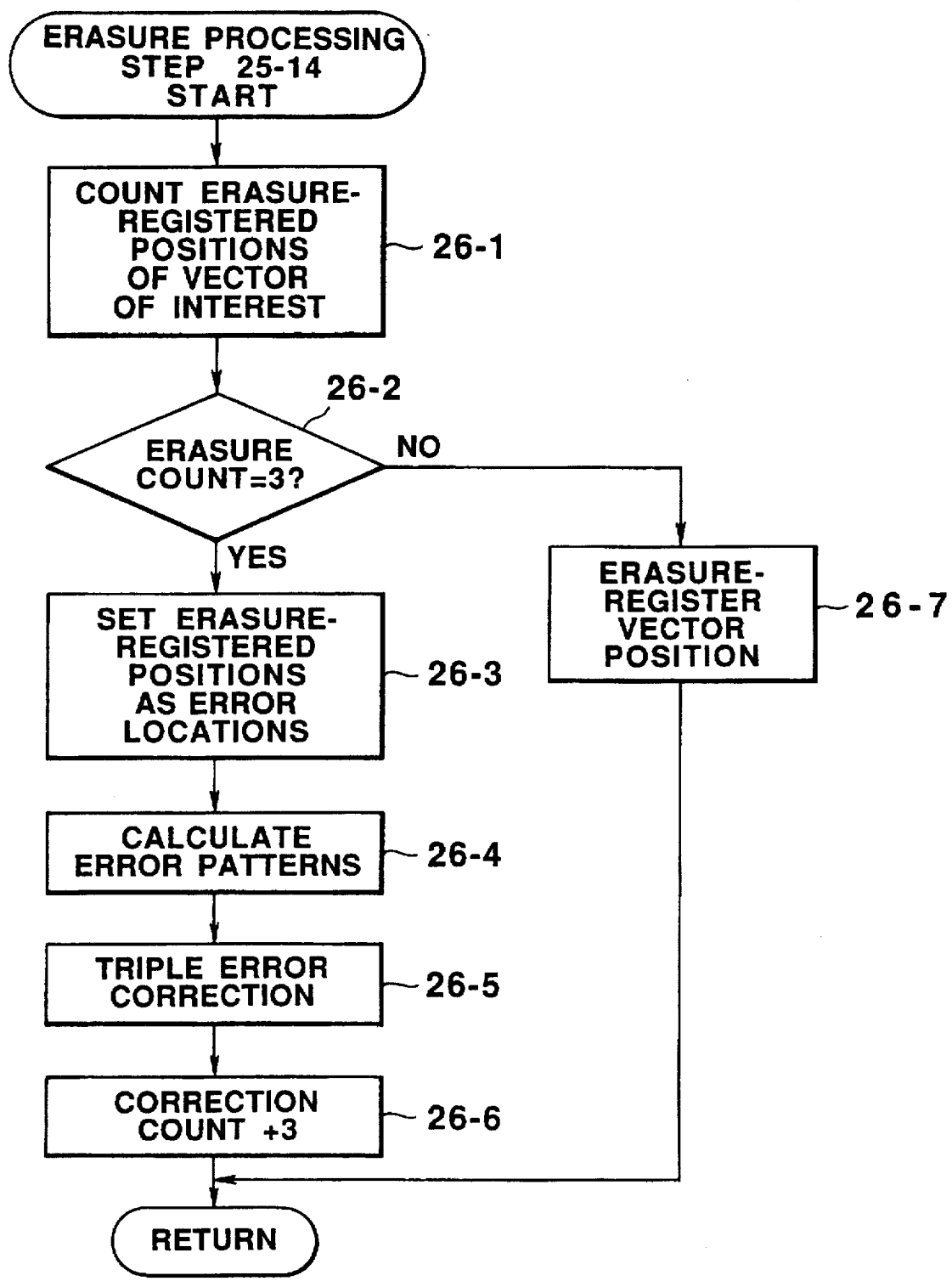
FIG. 38 is a detailed flow chart of erasure processing shown in FIG. 37.
Figure 39A:
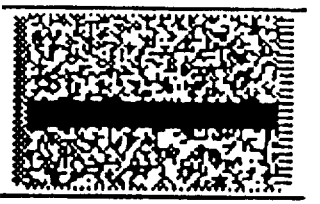
FIGS. 39(a) –39(g) show encoded images with errors which data can be reproduced by the data reproduction apparatus of the third embodiment.
Figure 39B:
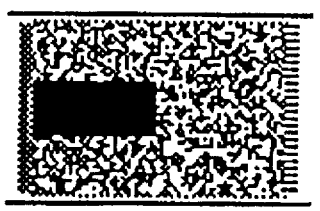
Figure 39C:
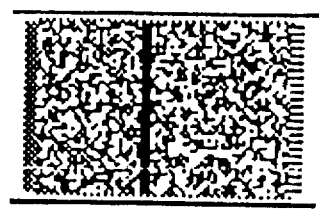
Figure 39D:
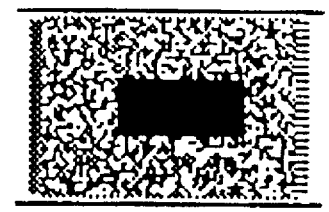
Figure 39E:
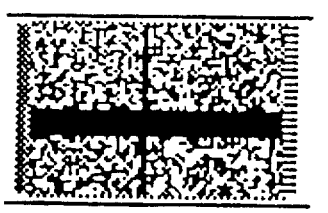
Figure 39F:
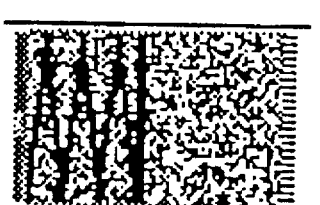
Figure 39G:
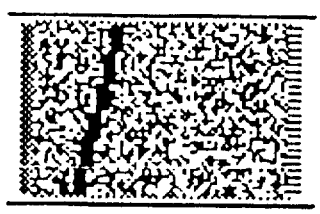

FIG. 38 shows an example of erasure processing step 25-14. In step 26-1, erasure-registered positions of a vector of interest are counted. For example, if vectors $P_0$ to $P_2$ are erasure-registered for the vector $Q_0$ in FIG. 35, the positions of the symbols $S_0$, $S_1$, and $S_2$ have a high possibility of an error. It is checked in step 26-2 if the number of erasure-registered position is 3. If there is no erroneous correction so far, symbols at positions which are not erasure-registered must be correct. Therefore, if triple-symbol errors occur, their positions must be erasure-registered. Thus, if YES is determined in step 26-2, triple-symbol errors are determined, and error patterns are calculated using the three erasure-registered positions as error locations. For example, if the three error location values are represented by $X_1$, $X_2$, and $X_3$, and their error patterns are represented by $Y_1$, $Y_2$, and $Y_3$, the following equations are established:

$$S_0 = Y_1 + Y_2 + Y_3$$

$$S_1 = X_1 Y_1 + X_2 Y_2 + X_3 Y_3$$

$$S_2 = X_1^2 Y_1 + X_2^2 Y_2 + X_3^2 Y_3$$

Since only the error patterns $Y_1$, $Y_2$, and $Y_3$ are unknown in these three simultaneous equations, their solutions can be obtained. For example, $Y_3$ can be calculated by:

$$Y_3 = \frac{X_1 X_2 S_0 + (X_1 + X_2) S_1 + S_2}{(X_1 + X_3)(X_2 + X_3)}$$

In step 26-5, error patterns are respectively added to three symbols on the matrix associated with errors to correct these symbols, and the correction count is incremented by 3 in step 26-6.

If the number of erasure-registered positions is not 3 in step 26-2, the position of the vector of interest is erasure-registered to give an opportunity of erasure processing by vectors of another system (Q vector) different from the vector of interest (e.g., P vector) (26-7).

FIGS. 39(a)–39(g) show examples of burst errors on the encoded image 20. In FIGS. 39(a) to 39(g), contiguous black areas indicate burst errors. According to this embodiment, target data could be correctly obtained even if any burst errors shown in FIGS. 39(a) to 39(g) occur.

Embodiments of the present invention have been described. Various other changes and modifications may be made within the spirit and scope of the invention. For example, the data recording apparatus and the data reproducing apparatus can be easily integrated to constitute a recording/reproduction unit. The mesh pattern 22 as a two-dimensional mesh matrix without any gap is used as a data body of the encoded image 20 but may be a two-dimensional matrix of image elements including gaps. A photoelectric conversion type image sensor is employed in the above embodiments. However, a magnetic type image sensor which responds to a magnetic ink or the like may be used. In the above embodiments, scrambling (interleaving) processing and randomization processing of element values are separately executed. For example, position scrambling for moving element positions (i,j) on a two-dimensional matrix to other positions using a random number table may be executed to simultaneously remove DC components.

According to one arrangement of the present invention, when an encoded image on a recording medium is constituted by a two-dimensional matrix of image elements expressing data elements, error checking codes are added to a two-dimensional data matrix constituting target data as original information, and the encoded image as the two-dimensional matrix of image elements is printed on the recording medium according to the two-dimensional data matrix with the error checking codes. Therefore, a recording medium which is not easily influenced by errors can be provided even at a relatively high recording density. In addition, printing precision can be reduced according to error correction capability of error checking codes.

Furthermore, according to one arrangement of the present invention, data of an encoded image is read from a recording medium, image elements expressing data elements are detected from the read image data to obtain a two-dimensional data matrix, and an error on the matrix is corrected according to error checking codes included in this matrix, thereby reproducing target data. Thus, target data can be correctly reproduced even if an error occurs on a two-dimensional data matrix when an encoded image is read, when image elements are recognized from the image data, or due to error factors before these processes.

Since a means for changing the order of a data matrix with error checking codes in recording and for reversing the order to restore the original data matrix with the error checking codes in reproduction is arranged, characteristics strong against burst errors can be obtained. More specifically, even when errors continuously occur in recognition of image elements during reproduction due to a considerably large contamination on an encoded image on a recording medium, the burst errors can be converted to discrete errors on the original data matrix with the error checking codes. Therefore, these errors can be easily corrected within the error correction capability of the error checking codes. As a result, reproducibility of correct target data can be improved.

Furthermore, according to one arrangement of the present invention, a read error of image elements of an encoded image caused by a change in conversion characteristics of an image sensor, especially, a change in characteristics caused by DC components, i.e., continuation of the same density is taken into consideration. When an encoded image is recorded, element values of a data matrix constituting given data are randomized using pseudo random numbers. Upon reproduction, after the randomized data matrix is obtained, the data matrix is derandomized to restore element values of the original data matrix. Therefore, no long mesh arrays having the same density appear in the encoded image on the recording medium. When the encoded image is read, pixels can be accurately digitized (e.g., binarized), and an error in reproduced data caused by a read error can be prevented.

Some embodiments of the present invention have been described. However, these embodiments are merely examples, and the present invention may have various other arrangements. All the modifications and applications of the present invention are incorporated in the scope of the invention, and, hence, the scope of the present invention should be determined by only the appended claims and their equivalents.

What is claimed is:

1. A data reproduction method comprising the steps of:

reading an encoded image as image data from a recording medium on which image elements including a mesh pattern having a rectangular shape as a whole and including dark and light image elements which are arranged at two-dimensional distributed positions, whose arrangement is determined based on a changed two-dimensional matrix obtained by changing an original two-dimensional matrix constituting target data in accordance with predetermined pseudo random numbers, respective randomized target data $b_n$ being obtained by executing an exclusive OR operation for target data $b_n$ with pseudo random numbers rnd(n);

detecting image elements from the read image data, and obtaining the elements of the randomized data to form the changed two-dimensional matrix; and changing the elements on the formed two-dimensional matrix according to the predetermined pseudo random numbers to form the original two-dimensional matrix, thereby reproducing the target data, said target data $b_n$ being obtained by executing an exclusive OR operation for the randomized target data $b_n$ with the same pseudo random numbers rnd(n).

2. A data reproduction apparatus comprising:

image sensor means for reading an encoded image as image data from a recording medium on which image elements including a mesh pattern having a rectangular shape as a whole and including dark and light image elements which are arranged at two-dimensional distributed positions, and whose arrangement is determined based on a changed two-dimensional matrix obtained by changing an original two-dimensional matrix constituting target data in accordance with predetermined pseudo random numbers, respective randomized target data $b_n$ being obtained by executing an exclusive OR operation for target data $b_n$ with pseudo random numbers rnd(n);

image element decoding means for detecting image elements from the read image data, and obtaining the elements from the read image data, and obtaining the elements of the randomized data to form the changed two-dimensional matrix; and derandomizing means for changing the elements on the formed two-dimensional matrix according to the predetermined pseudo random numbers to form the original two-dimensional matrix, thereby reproducing the target data, said target data $b_n$ being obtained by executing an exclusive OR operation for the randomized target data $b_n$ with the same pseudo random numbers rnd (n).

* * * * *